United States Patent
Ghetzler et al.

(10) Patent No.: US 6,270,309 B1
(45) Date of Patent: Aug. 7, 2001

(54) LOW DRAG DUCTED RAM AIR TURBINE GENERATOR AND COOLING SYSTEM

(75) Inventors: Richard Ghetzler, Buffalo Grove; Jerome F. Wojtalik, Jr., Hoffman Estates; Neils Kruse, Cary; Kendal R. Stephens, Fox River Grove; Harold Schmulenson, Buffalo Grove, all of IL (US)

(73) Assignee: Ghetzler Aero-Power Corporation, Buffalo Grove, IL (US)

( * ) Notice: Subject to any disclaimer, the term of this patent is extended or adjusted under 35 U.S.C. 154(b) by 0 days.

(21) Appl. No.: 09/461,551

(22) Filed: Dec. 14, 1999

Related U.S. Application Data

(60) Provisional application No. 60/112,141, filed on Dec. 14, 1998.

(51) Int. Cl.[7] .............................. F01D 17/06; F01D 17/14
(52) U.S. Cl. ................... 415/35; 415/36; 415/42; 415/44; 415/150; 415/157; 415/160; 415/161; 137/15.1; 137/15.2; 244/53 B; 244/58; 290/52
(58) Field of Search ................... 415/35, 36, 30, 415/42, 44, 150, 157, 159, 160, 161, 181; 244/53 R, 53 B, 58; 137/15.1, 15.2; 290/43, 44, 52, 54, 55

(56) References Cited

U.S. PATENT DOCUMENTS

| | | | | |
|---|---|---|---|---|
| 2,790,304 | * | 4/1957 | Besserer, Jr. | 137/15.1 |
| 4,267,775 | * | 5/1981 | Sjotun et al. | 244/53 B |
| 4,477,039 | * | 10/1984 | Boulton et al. | 244/53 B |
| 5,505,587 | * | 4/1996 | Ghetzler | 415/49 |

\* cited by examiner

*Primary Examiner*—Christopher Verdier
(74) *Attorney, Agent, or Firm*—Edward J. Chalfie

(57) ABSTRACT

A low drag ducted ram air turbine generator and cooling system is provided. The ducted ram air turbine generator and cooling system has reduced drag while extracting dynamic energy from the air stream during the complete range of intended flight operating regimes. A centerbody/valve tube having an aerodynamically shaped nose is slidably received in a fairing and primary structure to provide a variable inlet area. An internal nozzle control mechanism attached to the valve tube positions nozzle control doors to provide variable area nozzles directing air flow to the turbine stator and rotor blades to maintain optimum generator efficiency. An alternate embodiment includes an annular internal nozzle having interleaved panels to modulate the air flow to the turbine.

16 Claims, 20 Drawing Sheets

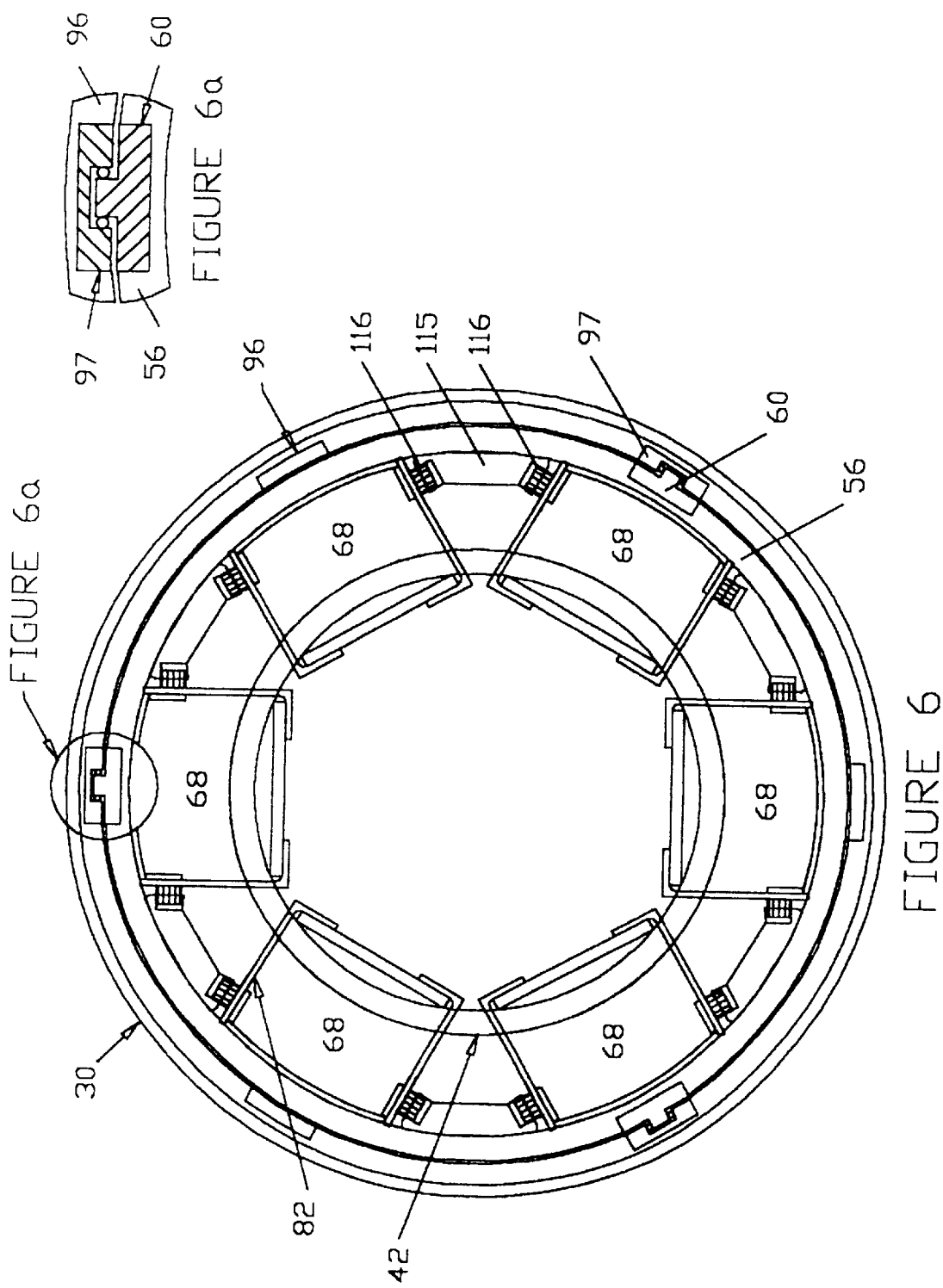

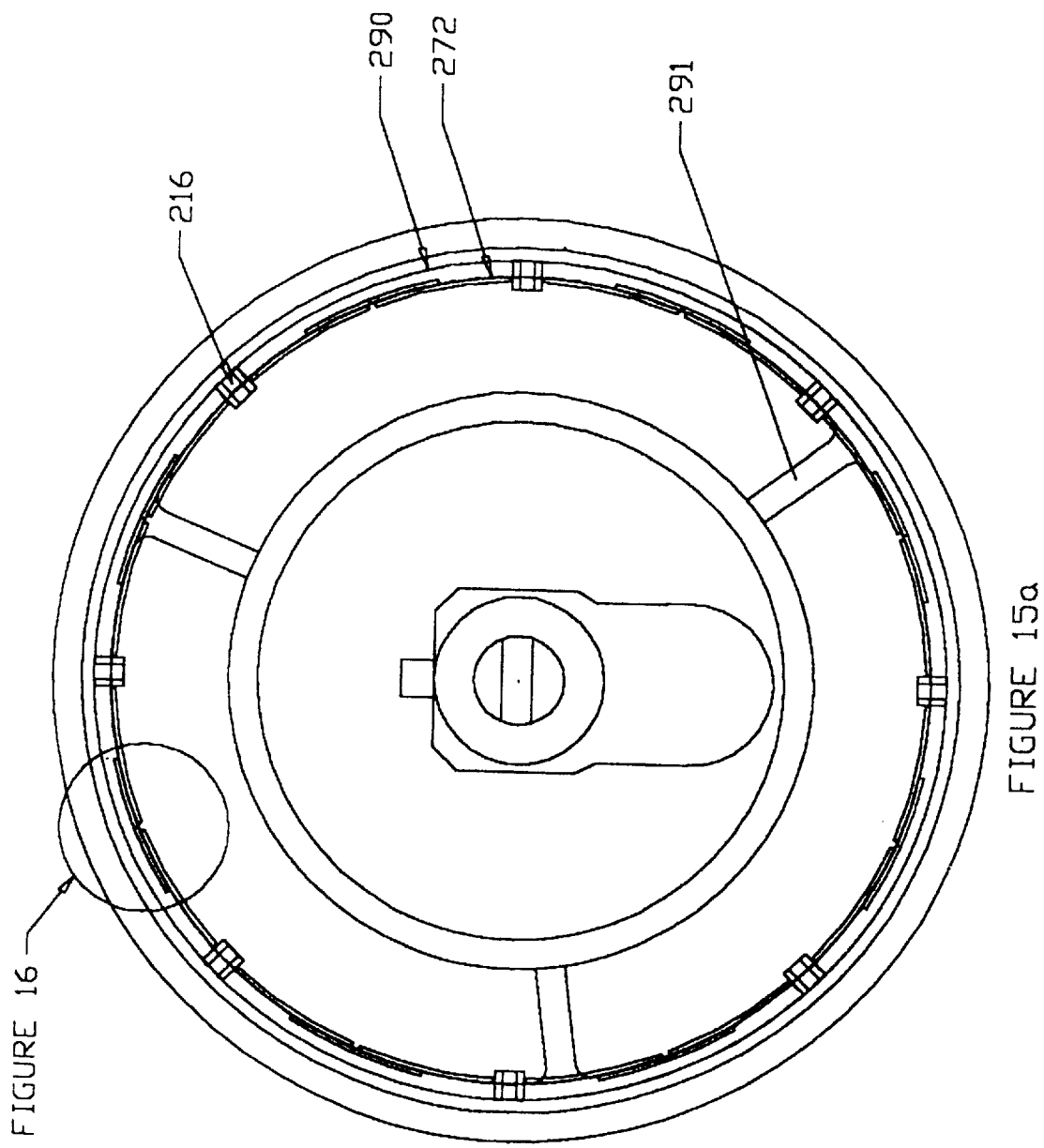

LOW DRAG DUCTED RAM AIR TURBINE GENERATOR AND COOLING SYSTEM

This application claims benefit under 35 U.S.C. 119(e) of U.S. Provisional Application No. 60/112,141, filed Dec. 14, 1998.

BACKGROUND OF THE INVENTION

1. Field of the Invention

The present invention relates generally to ram air turbine devices and more particularly to a ducted type ram air turbine generator.

2. Description of the Prior Art

One type of ram air turbine generator disclosed in the prior art consists of a ram turbine generator with the blades mounted externally to extract power from an air stream. The blades are usually mounted to a rotatable housing forming part of a center aerobody with the turbine center shaft drivingly coupled to an electric generator, or a hydraulic pump, or both if desired. Turbine speed control and power output are maintained through speed control mechanisms which vary the pitch of the blades under varying flight conditions, thereby tending to maintain constant power to the blades from the air stream. This type of ram air turbine generator is presently the predominate type used on externally carried electronic pods, primarily in military applications, and for emergency power electric/and or hydraulic power. The units are stored in the wing or fuselage of an aircraft and are deployed into the air stream when there is failure of the onboard aircraft power. Recent patents relate to improvements in this basic technology. U.S. Pat. No. 5,249,924 (Brum) relates to mechanisms and controls to adjust the pitch of the blades for speed control. U.S. Pat. No. 4,991,796 (Peters, et al) discloses a drive system between a ram air turbine and power generator units aboard a host aircraft. U.S. Pat. No. 5,122,036 (Dickes et al) discloses an externally bladed ram air turbine generator with a mechanism to prevent blade stall and to allow power generation at low speeds, including aircraft landing approach and final landing.

The process of converting air stream power to mechanical rotary power in externally bladed turbines, in terms of power extracted relative to the power dissipated through drag, is relatively efficient at low to moderate subsonic speeds. However as the flight speed of the aircraft increases, to values where the relative velocity between the air and blade becomes sonic, efficiencies of the process fall off dramatically. In these regimes the shock waves, induced by the blades, create high frontal pressures on the blades and flow separation over and behind the blades, with corresponding dramatic increases in drag. This can occur at flight speeds in the range of Mach=0.60 depending on the blade design and shaft rotational speed. As flight speed further increases to high subsonic, through transonic, and into supersonic flight regimes, the drag to lift ratio can further increase at least several times depending on blade profile, reflecting equal increases in the drag for the same power extracted from the air stream, which is produced by the blade lift. These drag increases can be critical in applications to electronic pods mounted to high performance supersonic fighter aircraft. With increasing power needs for electronic systems in external aircraft pods, this drag penalty for the external turbine bladed technology has increasing undesirable impact on aircraft performance, adversely affecting speed, maneuverability and range. In addition, external bladed ram turbine generators do not have the capability to provide direct cooling from the exhaust air. In applications where portions of the flight profile include high speed flight which induces significant aerodynamic heating on the skin of a pod, additional active cooling systems are required for the pod electronics, entailing additional size and weight penalties.

Ducted ram air turbine generators are a second type of ram air turbines. U.S. Pat. No. 4,267,775 (Sjotun) discloses a ram air turbine generator positioned internally, in the nose of a missile, with a wreath arrangement of inlet ducts supplying ram air to the inlet of a radial flow turbine. Outlet ducts direct the exhaust flow forward. During supersonic flight of the missile, the shock waves off the front of the missile increase the pressure in front of the exhausts, tending to increasingly throttle the flow through the ducts and turbine as the missile accelerates, thereby tending to limit the maximum speed of rotation of the turbine. However, drag reduction features were not a goal and were not present. The drag is large for the power extracted, due to the reaction forces set up from the full reversal of the air inlet stream, and the resistance to the exhaust flow from the oncoming air stream. No direct cooling capability is provided.

U.S. Pat. No. 4,477,039 (Boulton, et al) discloses a vented cowl variable geometry inlet for aircraft. A variable area vent, in the side of an air inlet cowl with a slidable door, can be positioned to allow air flow dumping, thereby permitting starting with high contraction inlets, for example as used in ram jets, and to control airflow to the engine during flight. The system is intended for use with supersonic aircraft air induction systems associated with air driven auxiliary power equipment. The system controls airflow supply to air driven power equipment, as is needed for speed and power control. However, the basic approach offered, including the air induction and then venting, with the shape of the leading edge of the door diverting the flow outward through vents, inherently does not offer a reduced drag.

Present inventor Ghetzler's earlier invention entitled "Ram Air Turbine Generating Apparatus", U.S. Pat. No. 5,505,587 discloses a ducted ram air turbine that obtains some measure of power output and speed control from purely aerodynamic and spring activated mechanical internal control elements. However, the ducted ram air turbine of that invention results in speed and power variation as great as thirty percent above or below a nominal design value throughout moderate subsonic through supersonic flight speed range. For many airborne applications the final power supplied to electronic systems requires a tighter tolerance on power and speed usually in the range of five percent. Thus, the use of this earlier invention may entail additional power conditioning systems with increasing size and weight penalties. This earlier invention has bypass features which admit and then bypass and exhaust a portion of the airflow before entering the turbine. As in the Boulton, et al, patent, the process of admitting, bypassing, and then exhausting airflow presents drag penalties due to the momentum interchange.

It is with the knowledge of the state of the present technology and limitations of that technology as just set forth, that the present invention was conceived and now has been reduced to practice.

SUMMARY OF THE INVENTION

The ram air turbine of this invention is designed to reduce drag in the process of extracting dynamic energy from the air stream and converting the energy to hydraulic and/or electric power during the complete range of intended flight operations. The intended operating flight regime for this invention is moderate to high subsonic through supersonic. Under conditions when power generation is not required, an aerodynamic shaped centerbody is advanced forward in the inlet completely shutting off the air inlet flow while presenting a low drag forebody to the air stream, thereby also minimizing drag induced by the presence of the device during the non operating mode. In addition to power generation capability, the present invention has the capability of providing cooling air flow to the generator and other external electronic equipment if desired, through the use of the exhaust air from the turbine which has been cooled in the process of performing work on the turbine.

In accordance with this invention, a ram air turbine generator comprises a generally cylindrical external fairing having an air inlet at the leading end and external exhaust ports proximate the aft end. The external fairing is mounted to a primary structure consisting of longitudinal spars which in turn are attached to several axially positioned rings in the forward part and structural bulkheads in the rear part of the fairing. An axially movable centerbody/cylindrical valve tube structure is coaxial with, and positioned inside the fairing and primary structure forward of the bulkhead structure, and radially proximate the inner surfaces of the axial spars and rings. An aerodynamically shaped forward nose acts as a centerbody in the air inlet. The forward nose is of smaller maximum diameter than the aft cylindrical valve tube. The aft part of the forward nose is attached to the aft cylindrical valve tube by aerodynamic shaped vanes which span the increased radius.

The centerbody/valve tube is slidable relative to the fairing and primary structure on axial slide mechanisms on the inner surface of the longitudinal spars of the primary structure. A coaxially mounted cylindrical center flow guide has an outer surface spaced radially inward from the fairing and primary structure with a front part slidably receiving the aft surface of the centerbody of the centerbody/valve tube. The centerbody/valve tube forward nose forms a centerbody of an annular variable area air inlet. Air flows through an annular space between the outer surface of the forward nose and the inner surface of the fairing, into the annular openings in annular channels formed between the aerodynamically shaped vanes, and then into an annular variable area nozzle formed between the inner surface of a plurality of nozzle control doors and the outer surface of the center flow guide.

The centerbody/valve tube assembly is moveable between a first maximum aft position (position 1), where the centerbody nose end is axially in line with the front of the inlet, thereby presenting the maximum inlet area to the air stream. A nozzle control mechanism attached to the valve tube positions the nozzle control doors to the maximum open condition. In this position, maximum airflow is permitted in the variable area inlet and nozzle passages, and through a stator and a turbine wheel, where a portion of the air stream's dynamic energy is extracted, and out through an exhaust deflector and the fairing external exhaust ports to the external environment. The turbine is drivingly coupled to and powers an electric generator.

In a second forward position (position 2), when maximum generator power output is required, the nose is advanced forward of the inlet plane, such that a minimum air inlet area is presented in the annular region between the centerbody and inner fairing surface. The nozzle control mechanism closes the nozzle control doors to their maximum extent.

In response to a signal from a turbine speed sensor, an electronic controller activates an electromechanical or electro-hydraulic actuator to move the centerbody/forward valve tube. The centerbody/forward valve tube is moved toward position 2 when flight conditions and generator load cause the turbine to overspeed above a certain tolerance. The centerbody/forward valve tube is moved toward position 1 when flight conditions and generator load cause the turbine speed to fall below a predetermined speed, within a certain tolerance, thereby tending to maintain the turbine wheel and generator speed within a predetermined speed range.

Thus, in a full power extraction mode, under changing flight conditions with varying air density and flight velocity, only sufficient air flow with sufficient kinetic energy will be admitted into the variable area diffuser and through the variable area nozzle to the turbine to maintain close to constant fluid dynamic power in the airflow through the turbine. Thereby the turbine and generator speeds are maintained at their design values. The variable area nozzles working in conjunction with the variable area inlet, control the variation in the airflow velocity to the stator and turbine to cause the turbine to efficiently extract energy from the air stream throughout the moderate subsonic through supersonic flight speed regime. The combination of admitting only the airflow required, and of efficiently extracting energy throughout the intended range of flight operation, minimizes drag throughout the operating flight speed range. During portions of a flight, when power requirements are reduced below normal operating levels, or completely cease, the centerbody/valve tube is advanced partially or completely forward toward a third or closed position (position 3), further reducing or completely closing off the inlet air flow, and further closing the nozzles, thereby presenting a clean aerodynamic forebody, which further reduces drag in the reduced or ceased power operating modes.

When cooling capability is desired or required for the generator and/or additional electronic systems, cooling capability is provided in an alternate embodiment of the present invention. The shaft work, performed by the air flow through the turbine, which is converted to electrical power by the generator, results in the exhaust air having lower internal energy or temperature than the total recovered temperature at the inlet. This cooled exhaust air is exhausted directly to the external environment through the exhaust duct when cooling effects are not needed. In the embodiment of this invention providing cooling, a bypass valve is provided in the exhaust duct for cooling control. When cooling is desired, the bypass valve closes off flow to the outside and directs the cooled turbine exhaust air downstream of the bypass valve through a cooling duct into a heat exchanger. To minimize back pressure, which would otherwise reduce turbine efficiency, the cooling duct is provided with low density cooling fins which form the cooled side of an air-to-air or a liquid-to-air exchanger. The other side of the heat exchanger receives heat dissipated by the equipment to be cooled via an air or liquid circulation loop.

Advantageous applications of the present invention include use with aircraft external electronic pods while flying at moderate to high subsonic through supersonic speeds. The aircraft will benefit by way of increased aircraft speed and/or range from reduced drag both while extracting power from the air stream and during the non-operating mode. The air turbine of the present invention results in a smaller maximum external diameter than present external bladed systems for a given level of power extracted. The ram air turbine of the present invention may be used in external aircraft stores or pods for generating auxiliary or emergency power to be supplied to the aircraft as needed. The present invention is applicable to both manned and unmanned aircraft. Where cooling capability is advantageous or required the embodiment of the present invention with cooling capability offers size and weight advantages over present systems which require separate cooling systems when an external bladed ram air turbine is used for power generation.

In military applications where the radar signature is important, the ram air turbine of this invention offers reduced signature compared to present external bladed ram air turbine generators. With an appropriate external fairing, the rotating turbine of the present invention is not visible from the outside.

Still other advantages and benefits of the ram air turbine of this invention will become apparent in light of the following description taken in conjunction with the following drawings. It is to be understood that the foregoing general description and the following detailed description are exemplary and explanatory but are not to be restrictive of the invention. The accompanying drawings, illustrate several embodiments of the invention, with and without cooling capability.

BRIEF DESCRIPTION OF THE DRAWINGS

FIG. 6 is a cross section taken along the line 6-6 of FIG. 3 showing the slide mechanism in the longitudinal spars and mating members from the centerbody/valve tube, which allows the centerbody/valve tube to slide relative to the longitudinal spars;

FIG. 6A is an enlarged partial sectional view of the axial slots and slide members which assure central positioning of the valve tube relative to the center flow guide member;

FIG. 15a is a cross-sectional view taken along the line 15—15 in FIG. 12, with the nozzle control doors in their fully open position.

DETAILED DESCRIPTION OF PREFERRED EMBODIMENT

Figure 1:
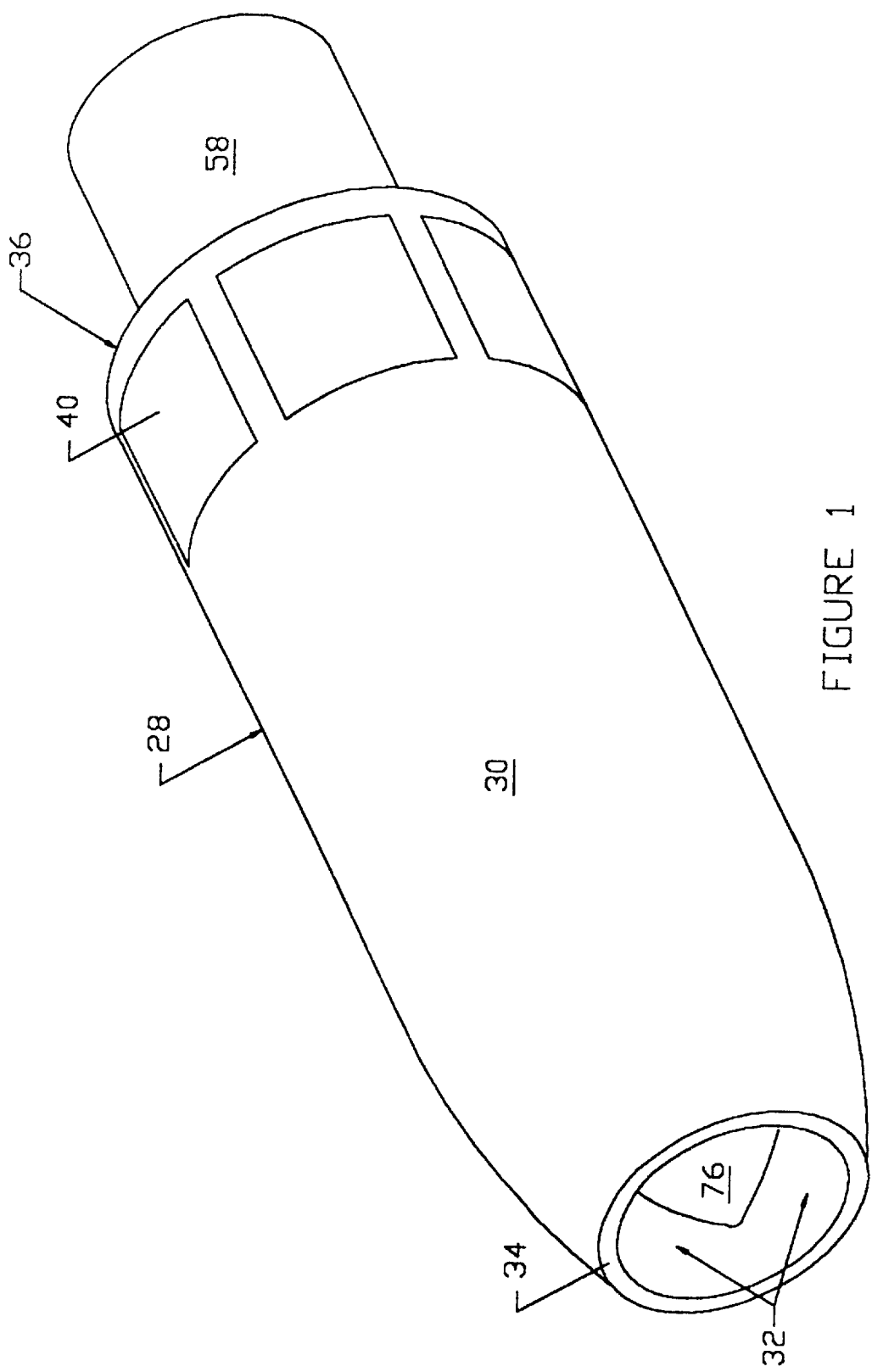
FIG. 1 is a perspective external view of a ram air turbine generating device illustrating a first embodiment of this invention.
Figure 2:
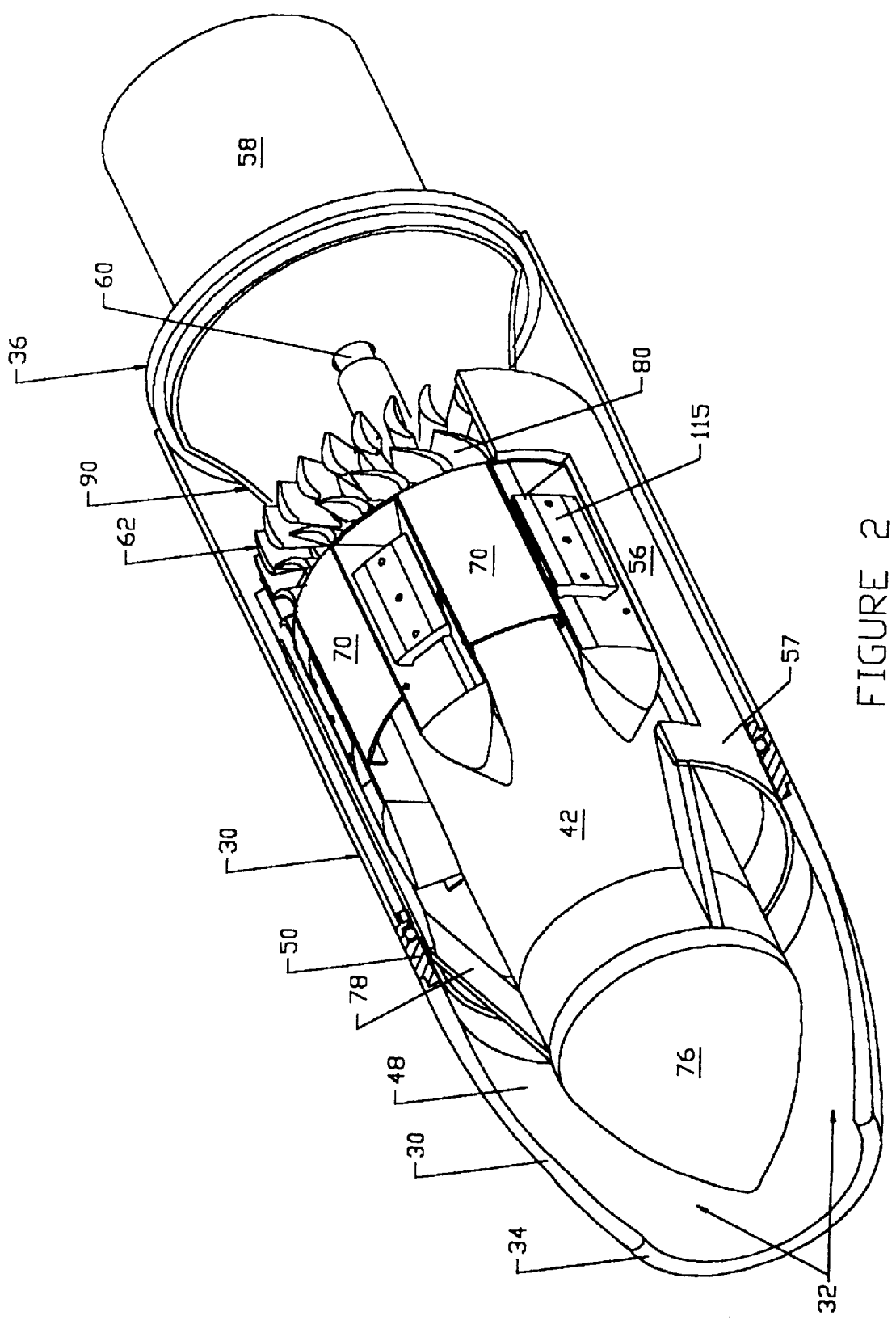
FIG. 2 is a perspective view of the ram air turbine generating device shown in FIG. 1 with certain parts being cutaway and others shown in section.

Referring initially to FIGS. 1–4, the overall construction of the ram air turbine generating device 28 in accordance with a first embodiment of this invention will be described. The device 28 comprises a generally cylindrical external fairing 30 extending between an inlet passage or diffuser 32 at leading end 34 and an aft end 36, and having a plurality of exhaust ports 40 proximate the aft end. The external fairing 30 is mounted to a primary structure consisting of a plurality of axially spaced circumferential rings 50 located in the front section of the device 28, and a plurality of axially spaced bulkheads located in the aft section of the device 28, that are connected by a plurality of longitudinal spars 96. A centerbody/valve tube 57 is slidably supported in axial slots 97, best shown in FIGS. 6 and 6a, composed of linear ball bearing or other suitable slide mechanisms which are positioned in the inner surface of the longitudinal spars 96 and which in turn are mated with matching axial slide members 60 mounted to and protruding from the outer surface of the valve tube part 56 of the centerbody/valve tube 57 into the axial slots 97.

The centerbody/valve tube 57 consists of a forward aerodynamically shaped nose end 76 which forms a centerbody in the air inlet passage 32, with the aft end of the nose end 76 attached to the cylindrical valve tube 56, which is larger in diameter than the aft part of the nose end 76, by a plurality of aerodynamically shaped radial vanes 78. A cylindrical center flow guide member 42 is coaxial with the valve tube 56 and is of the same external diameter as the aft part of the nose end 76 and slidably receives in its inner bore an underlapping aft part of the nose end 76. Together with the axial slots 97 and slide members 60, this construction assures the central positioning of the centerbody/valve tube 57 relative to the center flow guide member 42 throughout the axial movement of the centerbody/valve tube 57 with respect to the external fairing 30.

With the nose end 76 positioned in the maximum aft position (position 1), its forward end is in line with the leading edge 34 of the fairing 30, and maximum air flow is allowed through the circular cross section of the inlet passage or diffuser 32, through an annular variable area nozzle 68 defined between the inner surface of the valve tube 56 and the outer surface of the center flow guide member 42, through a plurality of stator vanes 80 which are mounted circumferentially of the central flow guide member 42 immediately downstream of the variable area nozzle 68, through a turbine wheel 62, turned outward by the exhaust flow deflector 90, and then out to the surrounding region through the aft internal exhaust ports 40 and the aft external exhaust ports 40.

A plurality of nozzle control door members 55 are positioned intermediate the valve tube 56 and the central flow guide member 42 and are operable to control the exhaust area of the nozzle 68 in response to movement of the valve tube 56 between positions 1 and 2 when full power output is required and between positions 2 and 3 when reduced power, down to fully ceased power, is desired. Embodiments of the invention using either a DC generator (alternator) or an AC generator can provide reduced power output when the electrical load is reduced below full power requirements by automatically positioning the valve tube 56 between positions 2 and 3 to maintain constant turbine and generator speed while reducing the generator field voltage and current to maintain constant generator output voltage at reduced load.

The nozzle control members 55 include circumferentially spaced control doors 70 pivotally mounted to side walls 82 of nozzle 68 for movement between a retracted position, substantially contiguous with the inner surface of the valve tube 56, and an extended position wherein they extend into the annular nozzle 68 toward the center flow guide member 42.

The control doors 70 are moved between the retracted and extended positions by a plurality of dual nozzle door control cams 115 mounted to the inside surface of the valve tube 56 and pairs of cam follower 116 mechanisms mounted to the side walls of the control doors 70 opposite the doors' pivot points 120. By reason of these and associated mechanisms, each of the control doors 70 is held in the retracted or open position when the valve tube 56 is in the first position and in the extended position when the valve tube is in the second position in a manner which will be more fully described below.

Figure 3:
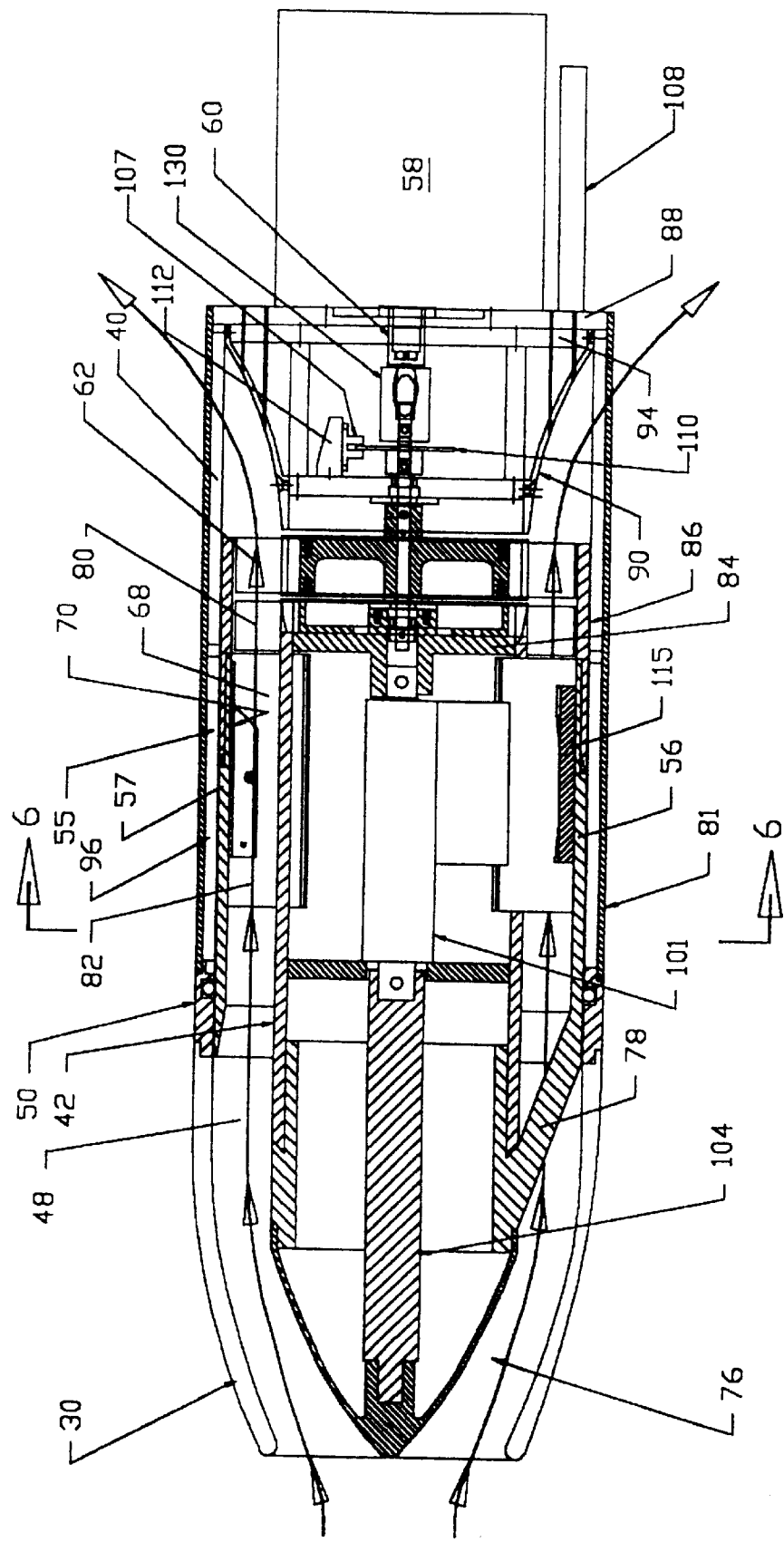
FIG. 3 is a half cutaway section of the ram air turbine generating device shown in FIG. 1, showing airflow streamlines and relative positions of primary internal components with the diffuser movable centerbody at maximum aft position and the nozzle control doors at full open position for the design flight condition.

FIG. 3 shows the air flow field streamlines and the relative positions of the internal parts corresponding to the first position, with the inlet and nozzles at their maximum open positions, which is termed the design flight condition. The design flight condition corresponds to the flight conditions where the product of density and velocity cubed, which is equal to the fluid dynamic power per unit area available in the air stream is at the minimum, and where full required power is to be generated. This condition would map into a minimum flight speed versus altitude curve where full power output is required. Two typical points on the design condition curve are Mach=0.80 at 37,000 ft. and Mach=0.45 at sea level. At flight speeds above the design condition at any altitude, excess fluid dynamic power is available in the air stream, and the system automatically adjusts the diffuser inlet area and nozzle exhaust area to efficiently, and with minimum drag, maintain design values of turbine and generator speed and power output in a manner described in more detail below.

Referring again to FIG. 3, as the air enters and flows through the inlet diffuser 32, the expanding flow area causes the air flow to decelerate, with the air stream recovering part of its kinetic energy in increased internal energy and pressure. This process is continued as airflow further decelerates while flowing through an expanding annular channel 48 between the inner wall of the fairing 30 and the outer wall of the center guide tube 42. The air flow then enters the plurality of variable area nozzle passages 68 formed between the inner wall of the centerbody/valve tube 57 and the central flow guide 42. Flow is re-accelerated in the nozzle passages 68, as the flow area is again reduced.

Figure 4:
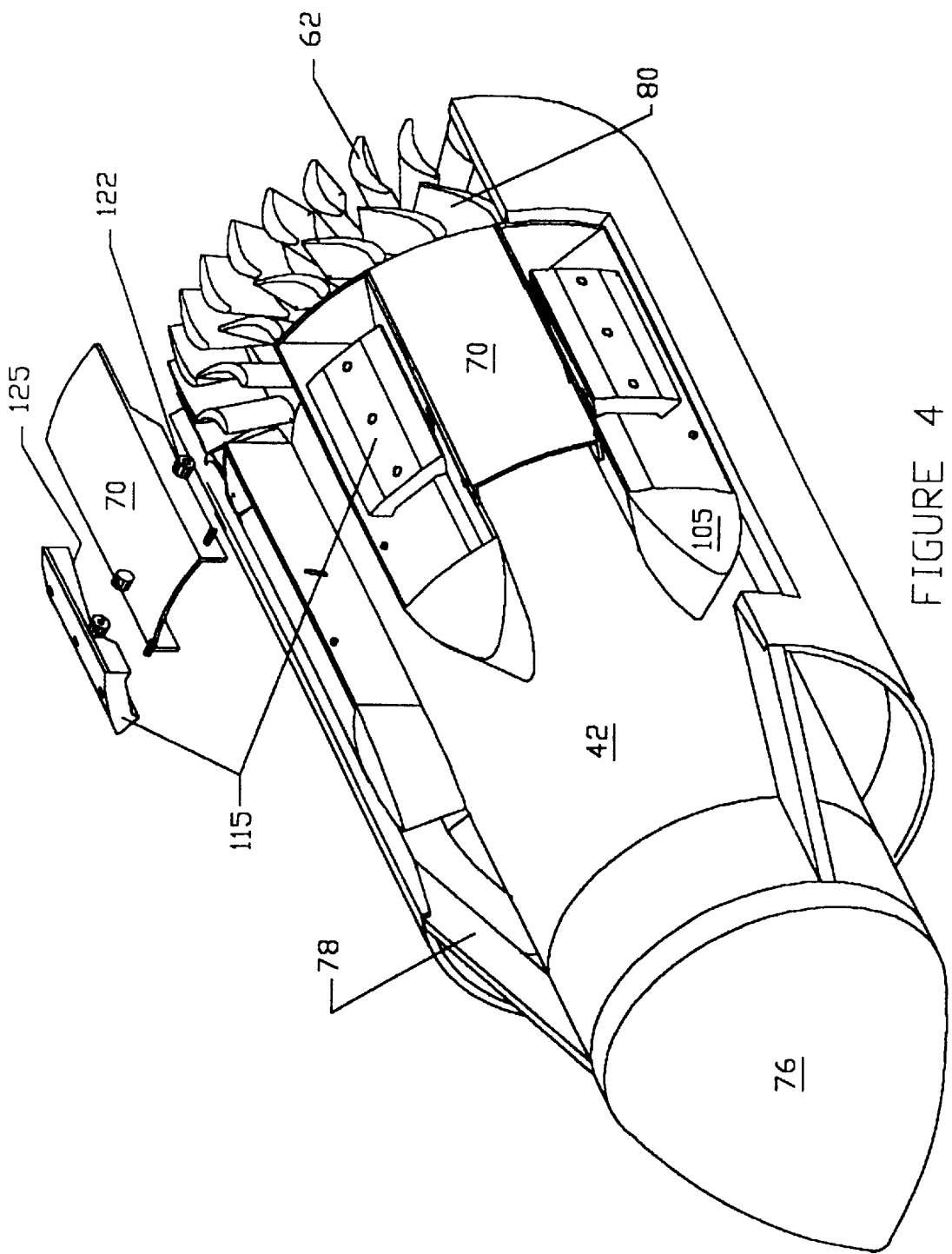
FIG. 4 is a perspective view of the ram air turbine generating device shown in FIG. 1, with portions of the flow control section and flow control mechanisms exploded.

The air flow control section including the nozzles 68, control doors 70, and the nozzle door control members 55 are best seen in FIG. 4, with one door 70 and an adjacent cam 115 shown in an exploded view for clarity. The dual track nozzle door control cam 115, with the cam track activation surface 125 facing radially inward, is attached to the inner surface of the valve tube 56, which is removed in this region for clarity. Each dual track nozzle door control cam 115 is positioned in the space provided between two adjacent nozzle side walls 82. Each pair of nozzle side walls 82 forming a variable area nozzle passage 68 are parallel to each other and are attached to the center flow guide 42. They extend within a small distance of the inner surface of the aft cylindrical valve tube 56 of the centerbody/valve tube 57.

Figure 5A:
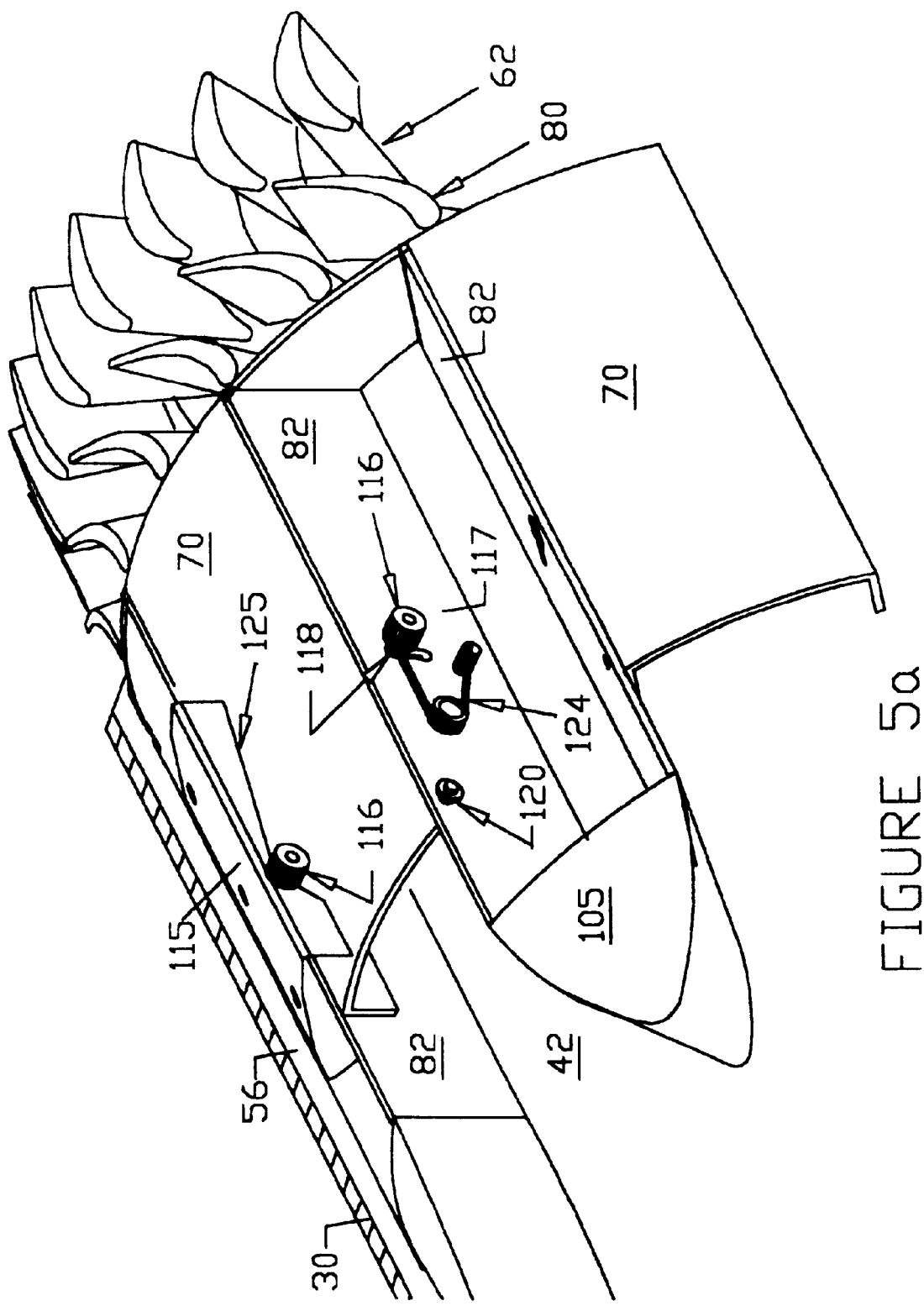
FIG. 5a is an enlarged perspective view of the nozzle and control door and associated control mechanisms positioned for design flight conditions of the ram air turbine generating device shown in FIG. 1.

In FIG. 4, and in the enlarged perspective of FIG. 5a, the relative positions of the door and control mechanisms for position 1 of the centerbody/valve tube 57, with the doors fully open, are shown. The actuation surface of the nozzle door control cams 115 contacts door cam followers 116, with the contact force provided by torsion springs 124 and internal aerodynamic exerting outward forces on the cam follower shafts 118. The door cam follower shafts 118 extend through slots 117 outboard of the nozzle side walls 82 to accommodate their motion as they are activated by the nozzle door control cams. They are engaged by one end of the torsion spring 124 mounted on the outboard side of the nozzle side walls 82. The cam follower shafts 118 are in turn connected to the side of nozzle control doors 70 mid span along the doors length through bearings 122 and the doors are pivotally mounted at their forward side to bearings 120 provided near the top of the side walls 82 of the nozzle.

Figure 5B:
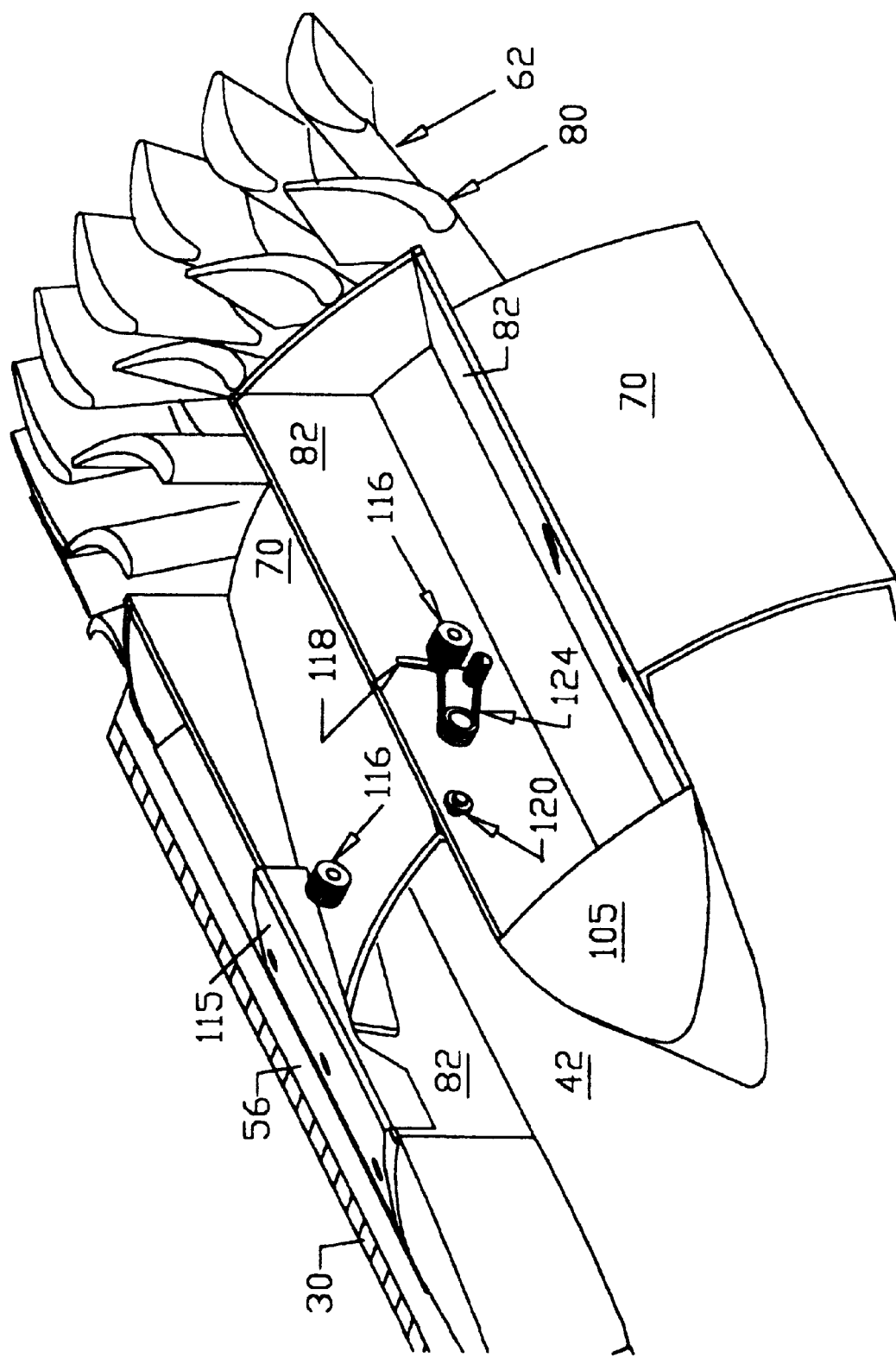
FIG. 5b is an enlarged perspective view of one nozzle and control door and associated control mechanisms positioned for above design flight conditions of the ram air turbine generating device shown in FIG. 1.

FIG. 5b shows the relative position of the door and control mechanisms for position 2, that is, the minimum nozzle area for full power generation at the maximum above design flight conditions. The nozzle door control cam 115 which is attached to the aft part of the valve tube 56, which is removed for clarity, has moved forward with the forward motion of the valve tube 56. The door is pivoted downward by acting against the cam follower 115 attached to the side of the door 70, moving against the internal aerodynamic forces in the nozzle 68 and the upward force of torsion spring 124.

Figure 7:
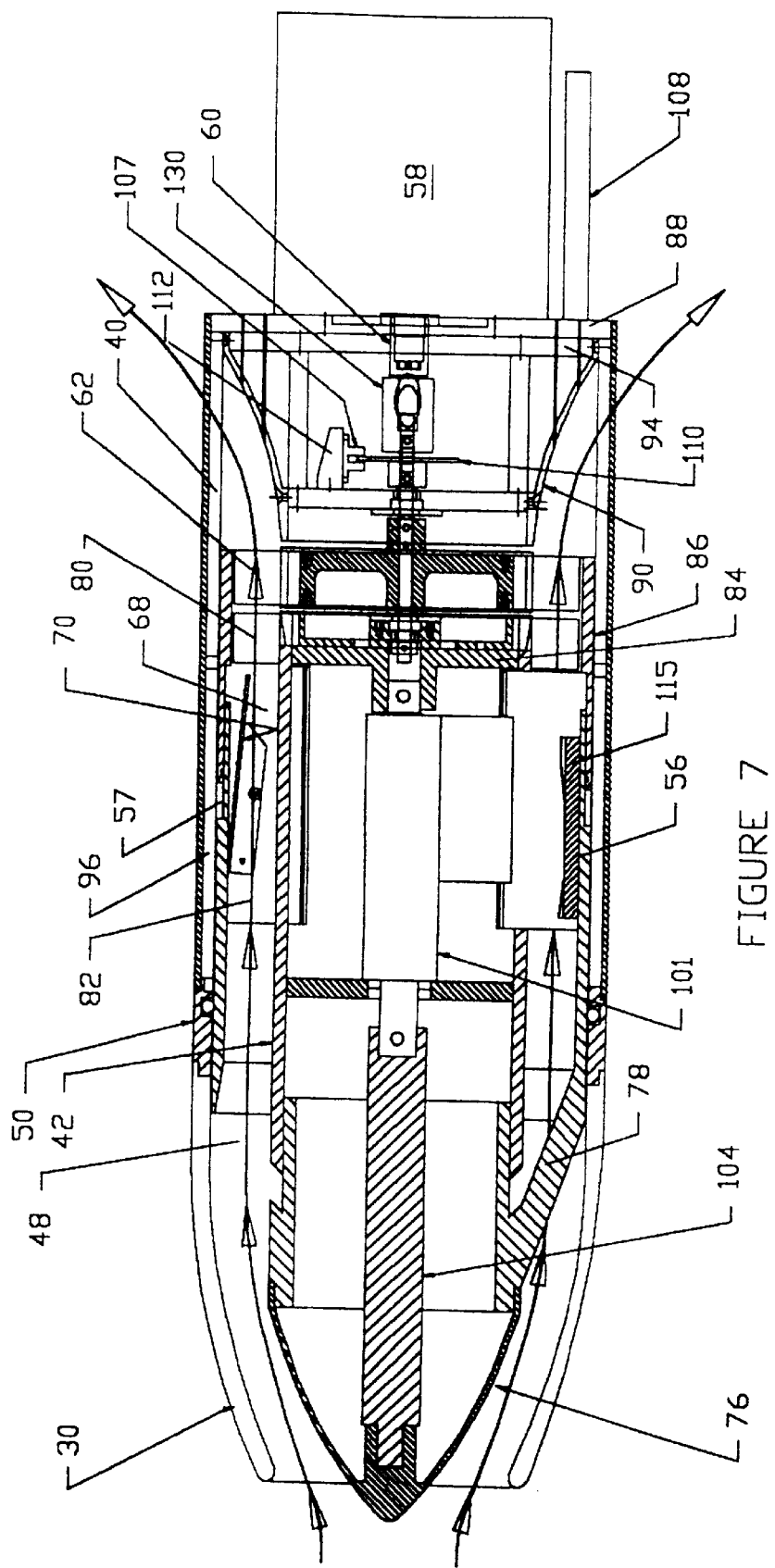
FIG. 7 is a longitudinal half section, similar to FIG. 3, showing air flow streamlines and relative positions of the primary internal components, the moveable centerbody/valve tube being advanced partially forward and nozzle control doors being partially closed for a subsonic above design flight condition.

The cross sectional view of FIG. 7 shows the air flow stream lines and the relative position of internal parts for above design flight conditions and for subsonic flight, where the available power in the air stream is greater than that required to meet design power requirements. That is, the nozzle has been partially closed as shown in FIG. 4. The minimum area of the nozzle exhaust is designed to accommodate the complete range of flight operational requirements in the intended aircraft applications. For example, assume the design condition is for Mach=0.80 (776 ft./sec.) at 37,000 ft. If the aircraft had a sea level speed capability up to the same speed of 776 ft./sec. (Mach=0.69) at sea level, since the air density and therefore the fluid dynamic power available per unit area is four times greater, the ram air turbine device of this invention is designed to be capable of reducing the inlet area and nozzle area to at least one fourth of the maximum area. If the flight speed is increased to Mach=1.6 or twice the design speed, the fluid dynamic power is proportional to the speed cubed and reduction in area to one eighth would be required. In general, all combinations of altitude and corresponding maximum speed for the potential aircraft application would be accounted for in determining the maximum nozzle area ratio reduction.

The nozzle control door cam 115 profile, which allows the maximum nozzle opening at position 1, has a geometric contour defined so that for each position forward of position 1 toward position 2, at which point the doors are closed to their maximum full power operating extent, the ratio of the total exhaust areas of the nozzles to inlet area of the diffuser is maintained constant. Referring again to FIG. 3, the center flow guide member 42 is supported at the aft end by a bulkhead 84 which has a plurality of radial spars 86 forming part of stator 81 and extending from the inner diameter of the stator 81 to a stator and turbine casing ring 86 enclosing the stator 81 and turbine wheel 62. The stator and turbine encasing ring 86 is, in turn, attached to the longitudinal spars 96 of the primary structure. In the embodiment as shown, the leading edge of each adjacent pair of nozzle side walls 82, which enclose the cam 115 and associated mechanisms, has a front nose enclosed with an aerodynamically shaped leading edge 105, to minimize drag as shown in FIG. 4. The nozzle control doors 70 are spaced between the nozzle side walls 82, and seals (not shown) on the edge of the control doors mate with the nozzle side walls 82 to minimize leakage.

Referring again to FIG. 3 which shows the location of the primary internal parts under design conditions, after exiting the plurality of annular nozzle exhausts, the air stream then flows fully through a plurality of fixed stator blades 80 which turn the flow in the direction of rotation of the turbine wheel 62 at an optimum angle from the turbine axis for the particular turbine design and turbine/generator design speed and a flight speed or flight speed range where maximum efficiency is desired. Usually the stator blades 80, blades of turbine wheel 62 and the turbine/generator rotating speed will be designed to provide the highest efficiency under conditions where the aircraft will operate most of the time, for example about Mach=0.80 and 37,000 feet for many jet aircraft.

Figure 8:
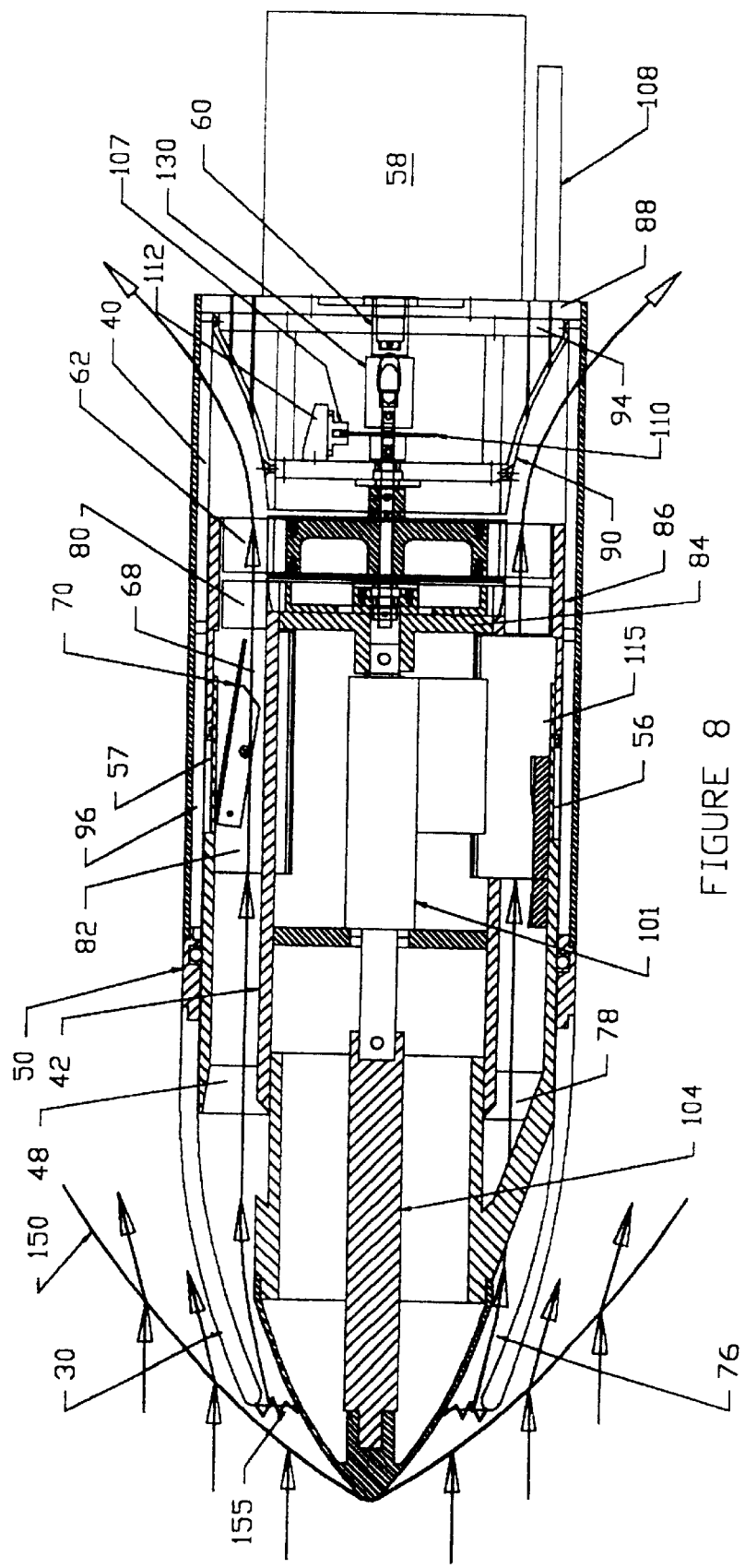
FIG. 8 is a longitudinal half section, similar to FIG. 3, showing the shock wave attached to the centerbody nose with an entrance shock residing at the inlet and the airflow streamlines and relative positions of the primary internal components, with the diffuser inlet and nozzle control doors partially closed for a supersonic above design flight conditions.
Figure 9:
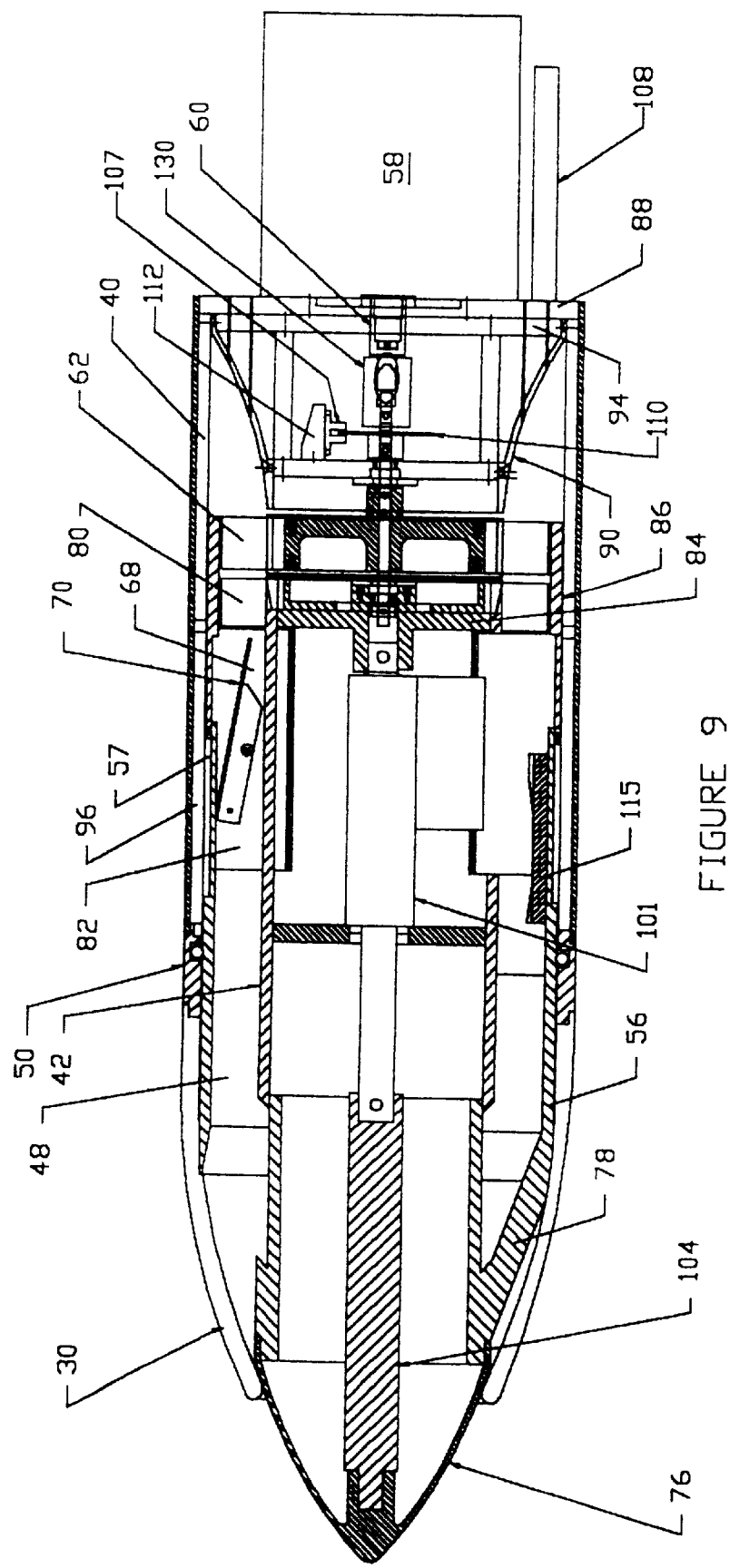
FIG. 9 is a longitudinal half section, similar to FIG. 3, showing the relative positions of the primary internal components, with the centerbody/forward valve tube advanced to the maximum forward position, presenting a clean aerodynamic surface to the external air stream when power generation is not required.

For above design flight conditions, the features which reduce the nozzle area in proportion with air inlet area will allow maintenance of the ratio of air flow velocities to the blade inlet turbine at close to the ratio of the flight speeds. Use of pure impulse turbine blades rotating at a constant turbine and generator shaft speed will provide high efficiency through the range of stator air outlet velocities/turbine inlet velocities of about 25 percent above or below design conditions. Therefore desirable turbine efficiency will be achievable for this example at flight speeds of 0.80 Mach+25 percent or between Mach=0.60 and Mach=1.00 or greater at 37,000 ft. altitude. This corresponds to Mach=0.50 at sea level with the sonic velocity being 20 percent greater than the sonic velocity at design altitude. High turbine efficiency is maintained in the transonic through supersonic region as will be explained while viewing FIG. 8. In transonic and supersonic flight, a conical shock wave 150 will be attached to the nose of the centerbody, and the flow will be deflected outward into a conical flow field with the downstream Mach number less than the free stream Mach number. The flow will then enter inlet 32 through an entrance normal shock wave 155 which will reside at the inlet or slightly in front of the inlet, with the resulting subsonic downstream flow, entering through the diffuser, initially slowing down and then accelerating in the nozzle passages 68. With the nozzle exhaust area adjusted by the cams to be equal to a fixed ratio of the diffuser inlet area for every position, and with the nozzle in a fixed or converging configuration at transonic or supersonic flight speeds, the exhaust will be choked, thereby limiting the exhaust to a maximum Mach=1.0 throughout the transonic through supersonic flight region. This ensures that maximum turbine entrance velocity will be limited to a maximum of no more than 25 percent greater than turbine entrance velocity under Mach=0.80 design conditions, thus ensuring high turbine efficiency through out the transonic and supersonic flight regime.

In some applications, high power output and high efficiency would be desirable through a broader minimum operating range, i.e., from low altitudes for speeds down to Mach=0.40 at sea level up to supersonic values at 37,000 ft. for example. In accounting for the variation in velocity of sound with local air temperature, the sea level flight Mach=0.40 condition would represent a relative air speed of 463 feet/second, versus 970 ft./second at the Mach=1.00 through supersonic at 37,000 ft. under standard day temperature conditions for both altitudes. For a given stator exhaust inclination angle to the turbine axis, optimal turbine efficiency is obtained by operating the turbine blade at a speed with a fixed ratio of the stator exhaust speed velocity. Therefore by choosing the mid point in speed, i.e., at 716 ft./sec. for the design point, the low speed and high speed operating points would be as much as 35 percent above and below the design point. With use of pure impulse turbine blade, the fall off in turbine efficiency would be greater than 20 percent and therefore excessive for this wide velocity range. By using a turbine blade design with some reaction capability, the falloff in efficiency through this wide air speed range will be limited to substantially lower values. The reaction blade turbine recovers part of the air streams kinetic energy by accelerating the flow in the channels between the blades which reduce in area along the flow path thereby acting as nozzles. In pure impulse blades all of the acceleration takes place prior to entrance in the stator channels, which act like nozzles. The air stream enters and leaves the turbine flow channel at the same velocity, while imparting force and performing work on the blades, purely by forces generated by momentum change results from the change in flow direction acting on the moving blades, thereby performing work and generating power. To implement the turbine reaction capability in a variation of the present embodiment of the invention, for cases where a wider speed variation with higher efficiency is desired, the inlet flow would be expanded to a great extent in the diffuser, thus allowing more of the total pressure recovery, by allowing part of flow acceleration to occur in the blade passages. The turbine operates at a higher speed to achieve this advantage. Design of stator and turbine combinations to achieve the desired performance over an available inlet pressure range is a well established discipline.

After extracting a portion of the fluid dynamic energy 10 from the air stream flow through the turbine, the flow is turned outward, with low turbulence, by the aft flow deflectors 90, to flow through the aft exhaust ports 40, into the external air stream. The exhaust air is cooled by the turbine expansion process. A portion of the cooled exhaust air is directed through generator cooling ducts 94, which indirectly cool the generator via conduction if desired, or directly using blast cooling with the generator enclosed (not shown) in the aft end with final cooling air exhaust ports (not shown) or is accommodated by a nose cavity of a pod.

Figure 10:
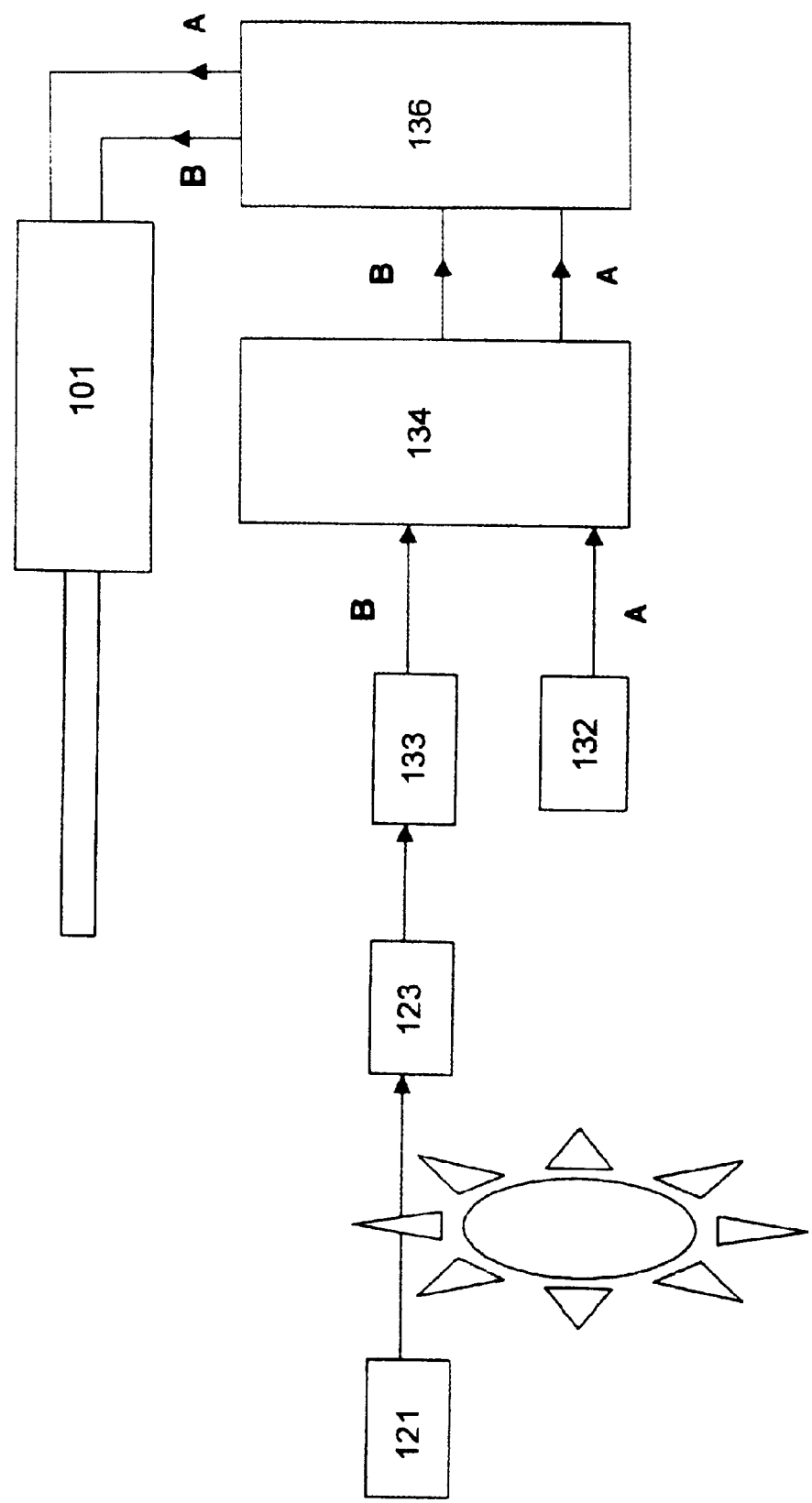
FIG. 10 is a functional block diagram of an electronic control system for controlling the turbine and generator shaft speed.

The centerbody/forward valve tube 57 is driven forward and backward through an actuator shaft 104 by a conventional linear electromechanical or electro-hydraulic actuator 101, which is positioned inside of the centerbody flow guide 42 as shown in FIGS. 3 and 7. The actuator is fixed on the aft end to a hub in the bulkhead 84 in a clevis type mounting. The forward end is attached by a clevis type mounting to the actuator shaft 104. Motion of actuator 101 is activated by an electronic speed controller 108 in response to a turbine/generator speed sensor 107 which is mounted to the turbine/generator shaft 160. FIG. 10 shows a functional schematic diagram of the electronic controller for the present embodiment.

Referring to FIG. 10, the electronic speed sensor consists of a rotating slotted disk 110 mounted with a central hub to turbine and generator shaft 60. A light emitting diode 121 and photo sensitive transistor 123, together termed the speed sensor 107, are mounted to a bracket 112 with the slotted disk 110 positioned intermediate between the diode and the transistor. As the slotted disk 110 rotates, the light beam to the photo transistor is interrupted producing a series of electronic pulses as the photo transistor is turned on and off. A frequency to voltage converter 133 (a standard converter using standard integrated circuit technology) converts the series of pulses into a DC output voltage B which is proportional to the frequency of the pulses. A digitally programmable voltage reference source 132, consists of a DC voltage source and a digitally controlled potentiometer of standard technology. The voltage reference output A of source 132 corresponds to a desired turbine/generator speed. A switched mode controller 134 is configured to produce a two phase series of pulses at a constant frequency, the pulse width being determined by the difference between the reference voltage A and the frequency to voltage converter output voltage B. The pulse widths of the A and B output of the switched mode controller 134 are inversely proportional. The A and B outputs of the switch mode controller 134 are connected to a two phase power amplifier 136, also of standard technology, which is used to increase the power level of the pulses to levels required to drive a DC motor in the linear actuator. If the reference voltage A and the frequency to voltage converter output voltage B are equal, the pulse widths of the A output and the B output of switched mode controller 134 will cancel, thereby providing no net field EMF and rotational torque to the actuator motor 101. If pulse width output A is greater than pulse width B, i.e., the reference voltage A is greater than the frequency converter output B, the rotational speed of the turbine generator is less than the design speed by the set tolerance and the actuator motor will be powered to rotate, and thereby move, via a ball screw mechanism, centerbody/valve tube 57 aftward toward position 1, to further open the air inlet and nozzles to maintain the turbine/generator within the desired speed range. If the opposite condition exists, i.e., the frequency converter output B is greater, the motor will be turned in the opposite direction, moving the centerbody/valve tube 57 toward position 2, closing the inlet and nozzles to reduce speed. In a preferred embodiment, for high reliability, a ball screw or electro-hydraulic mechanism is chosen for the actuator 101.

A generator 58 is positioned as shown in FIGS. 1, 2, 3, 7, 8, and 9 mounted to an aft bulkhead 88 with shaft 60 extending through a hole in aft bulkhead 88. The shaft 60 is attached to a shaft coupler 130 to accommodate any misalignment between the turbine and generator shaft. The shaft 60 then passes through the hub of the slotted disk 110, through the turbine wheel hub where attachment is made to the turbine wheel. The end of the shaft 60 forward of the turbine 62 then passes through a forward bearing which is located in the axial center hole of the aft bulkhead 84 of central flow guide member 42.

Figure 11A:
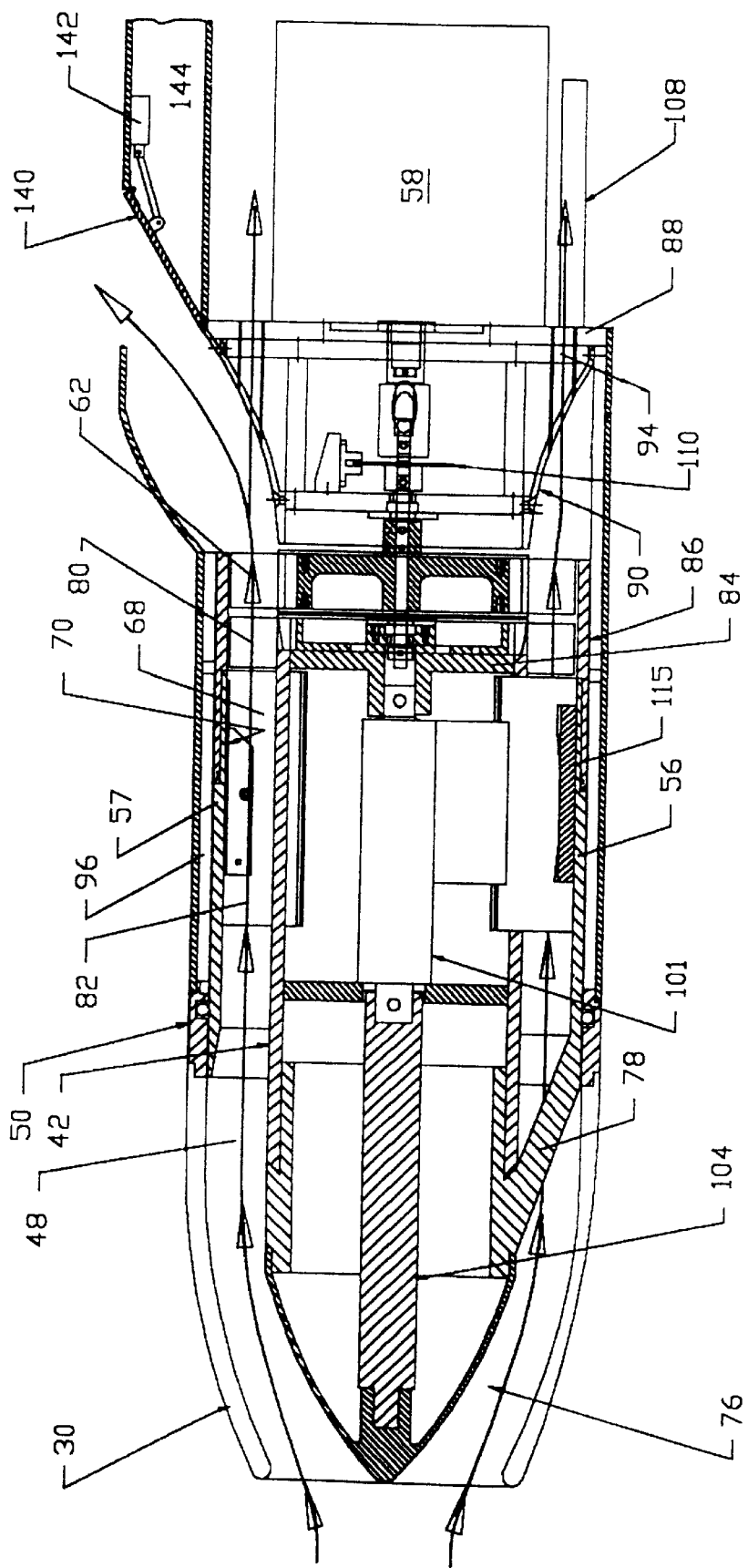
FIG. 11a is a longitudinal half section, similar to FIG. 3, showing the relative positions of the primary internal components for an embodiment of this invention with cooling capability.
Figure 11B:
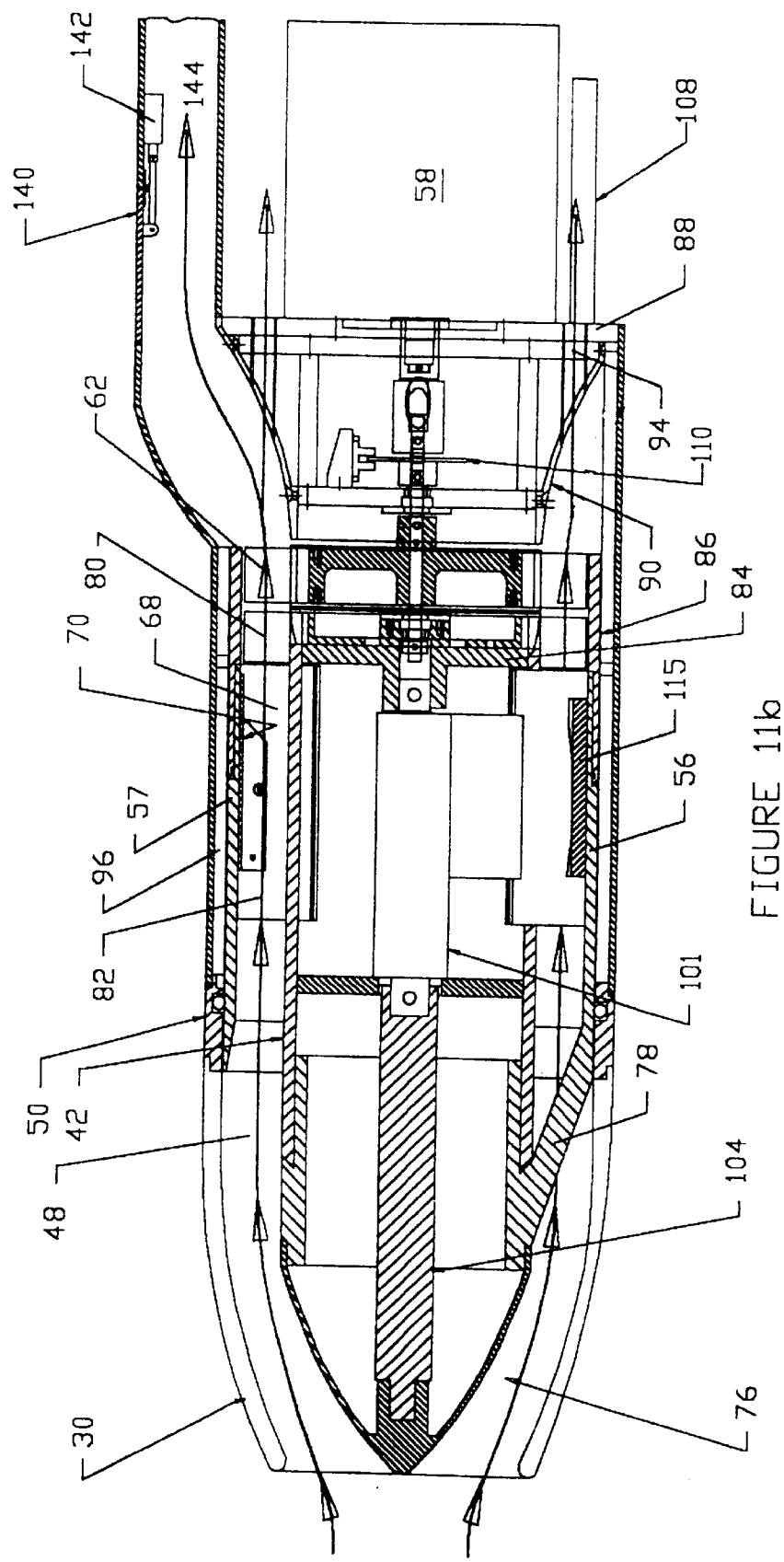
FIG. 11b is a longitudinal half section similar to FIG. 11a, showing the relative position of the internal components for an embodiment of this invention provided with cooling capacity, when cooling is required.

FIGS. 11a and 11b show a first alternate embodiment of the invention where the cooling capability of the invention is utilized. When cooling effects are needed, for example in the case of electronic systems powered by the ram air turbine generator, exhaust air from the turbine may be directed through a heat exchanger. When cooling effects are not needed the cooled turbine exhaust air will be ducted directly to the outside as shown in FIG. 11a. When cooling effects are needed a conventional thermostat (not shown) which is mounted to and senses the temperature of the equipment to be cooled will trigger a conventional actuator 142 to close the bypass exhaust valve 140 as shown in FIG. 11b, forcing the cooled turbine exhaust air through a cooling duct 144. An array of low density cooling fins are positioned in the cooling duct, with maximum allowable spacing to maintain low turbine back pressure and high turbine efficiency. High speed air flow through the duct will ensure high heat transfer efficiency for each cooling fin and the cooled side of the heat exchanger. Heat from the equipment to be cooled will be removed from the equipment and circulated through the hot side of the heat exchanger using conventional air or liquid circulation methods.

Figure 12:
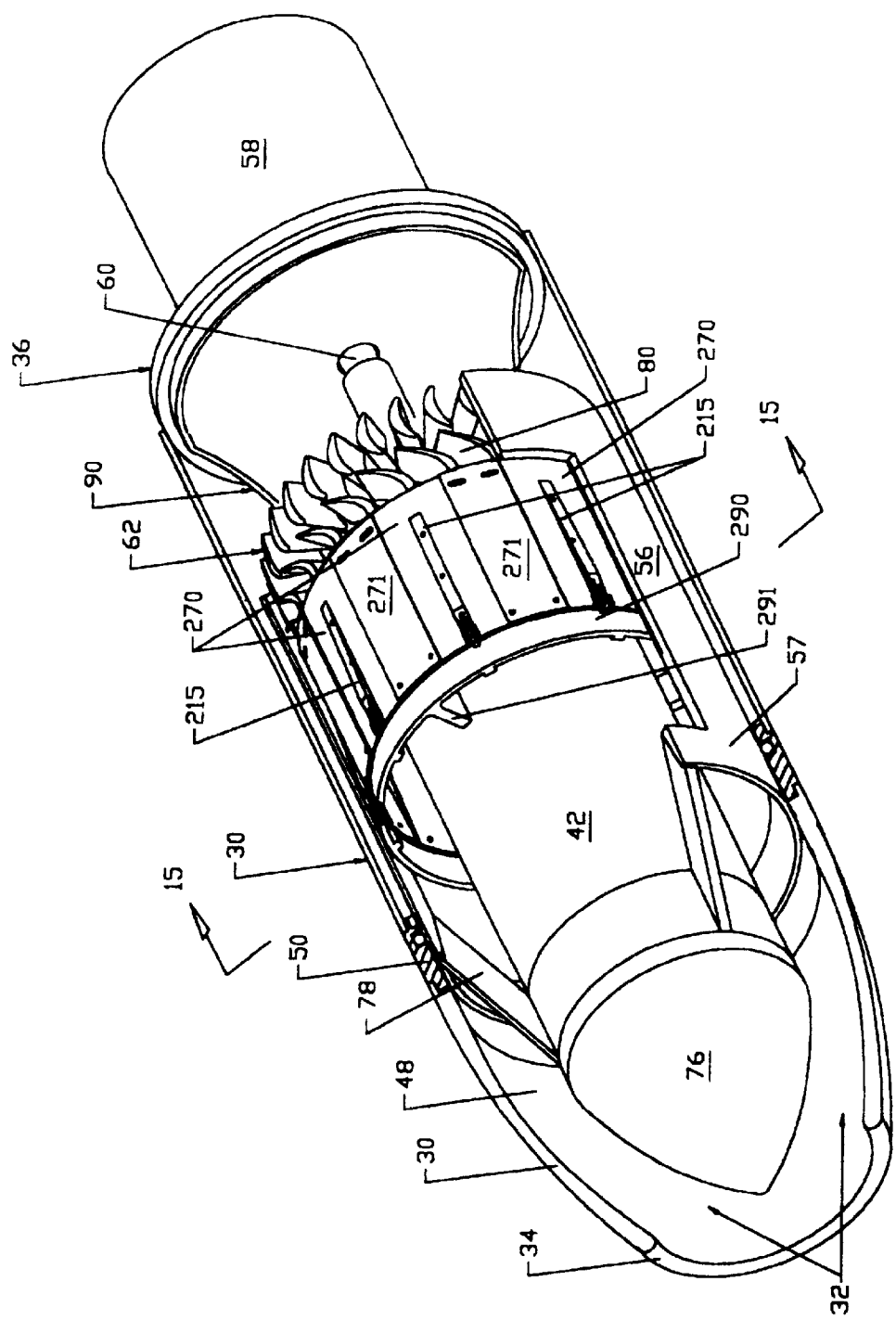
FIG. 12 is a perspective view of a ram air turbine generating device in accordance with another embodiment of this invention, with parts being broken away and others shown in section.
Figure 13:
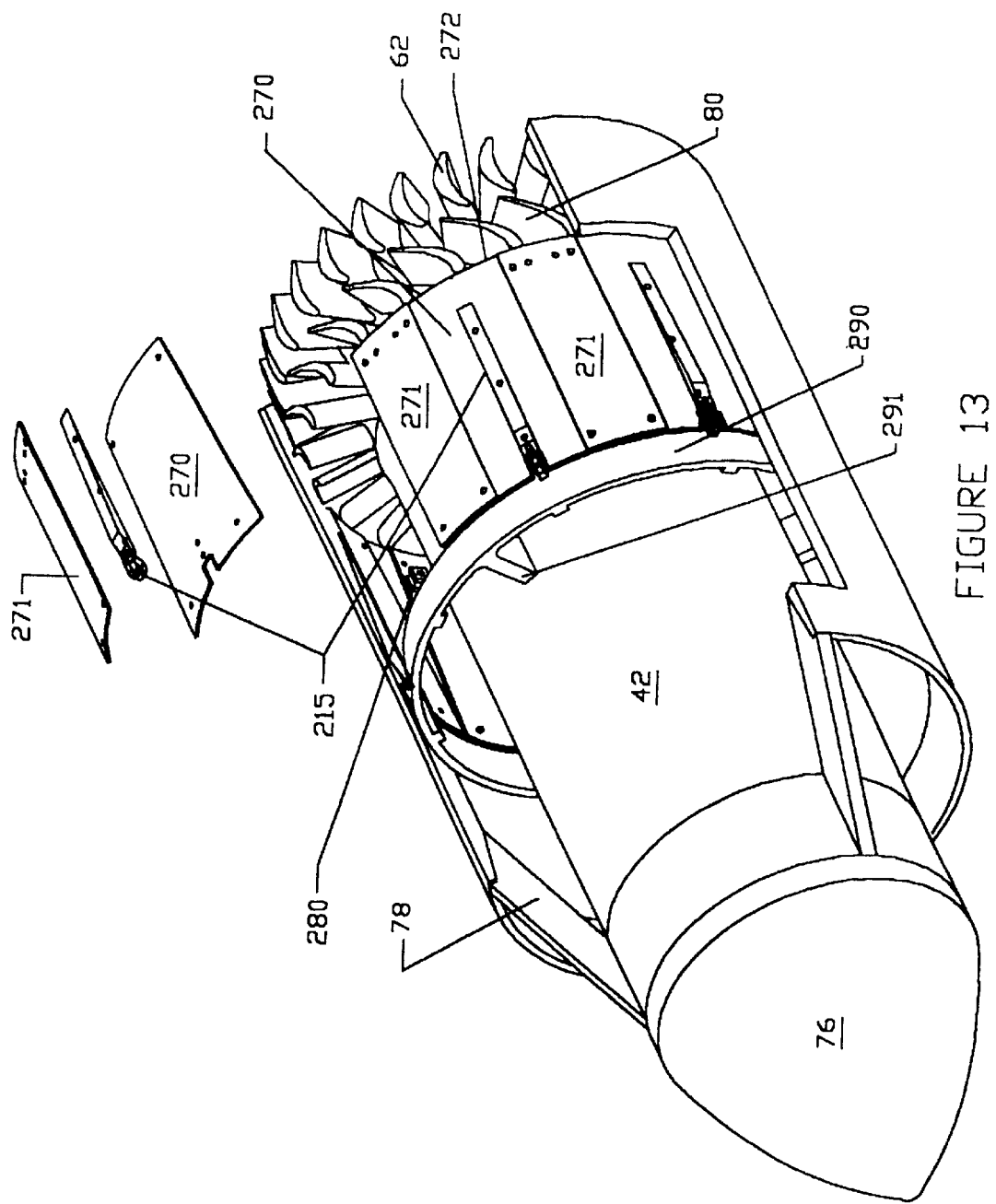
FIG. 13 is a perspective view of the ram air turbine generating device of FIG. 12, with portions of the flow control section and flow control mechanisms exploded.
Figure 14A:
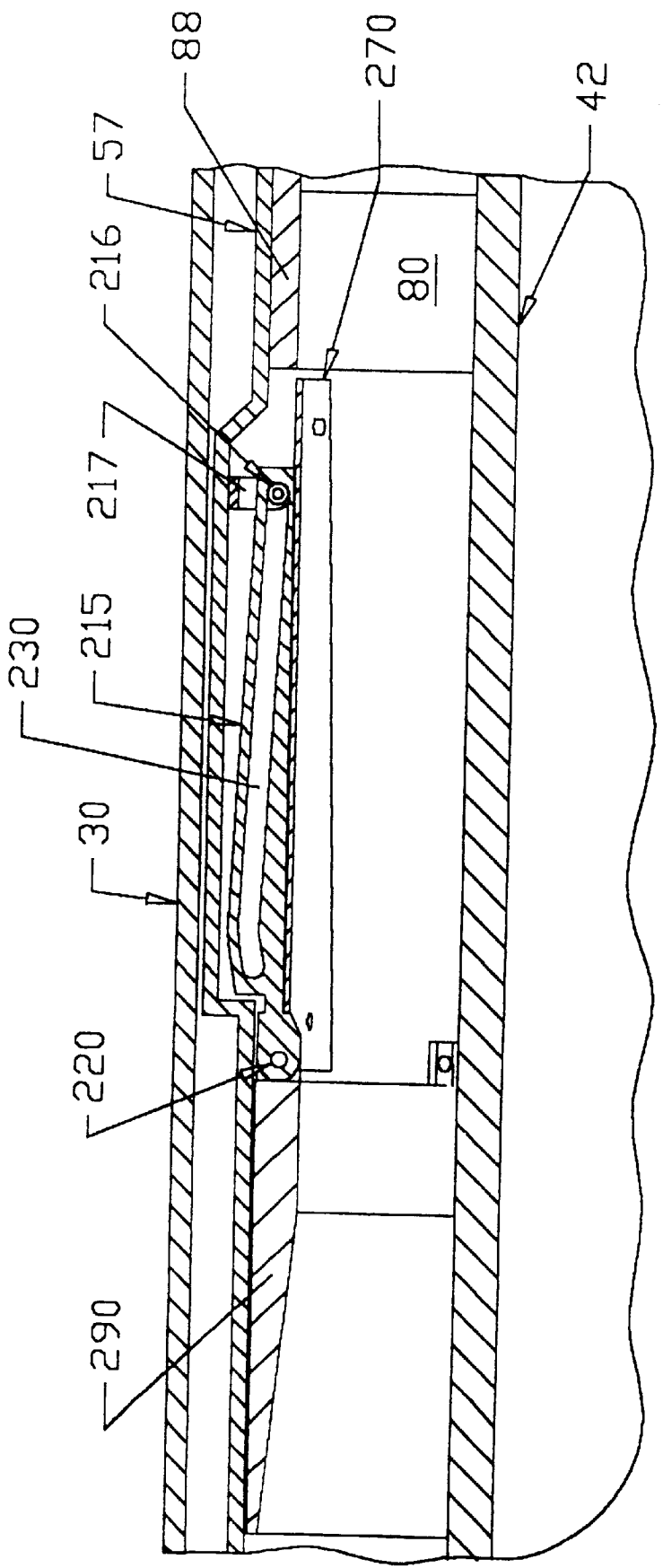
FIG. 14a is an enlarged partial sectional view of the ram air turbine generating device of FIG. 12, showing the nozzle control mechanism with the nozzle control doors in their fully open position.
Figure 14B:
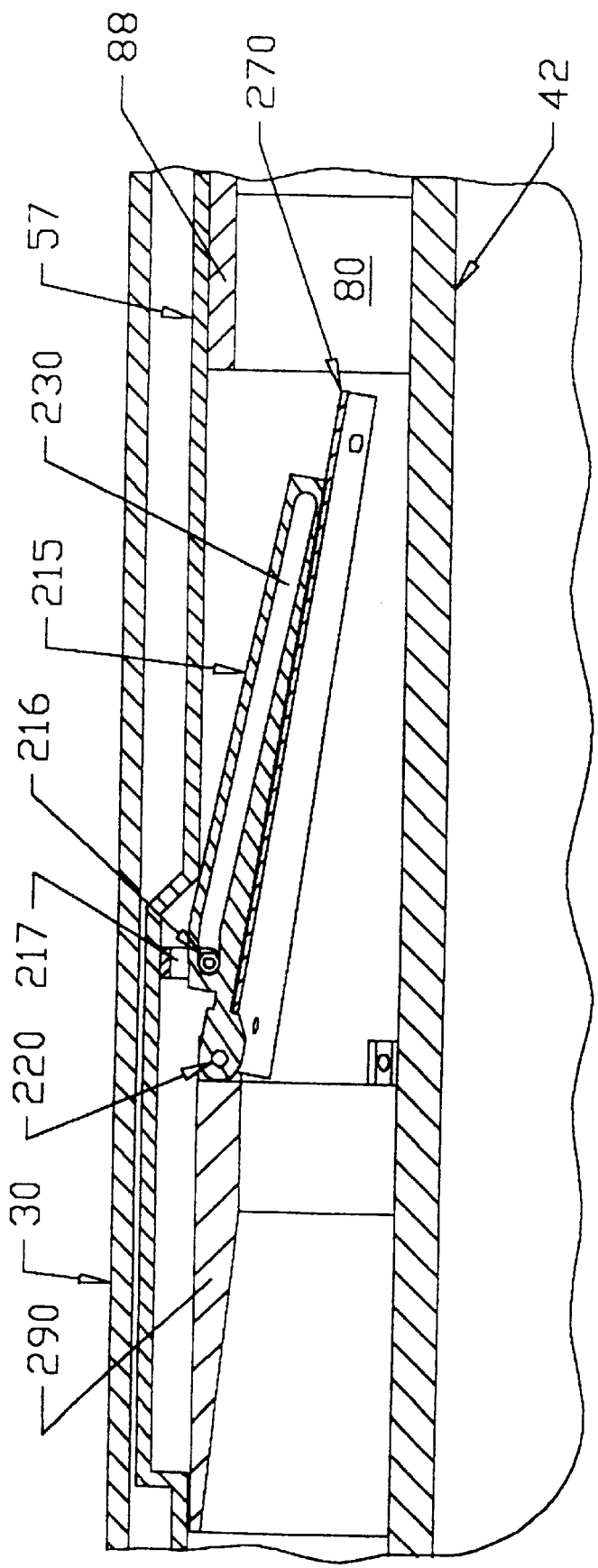
FIG. 14b is an enlarged partial sectional view, similar to FIG. 14a, showing the nozzle control mechanism with the nozzle control doors in their greatest flow restricting position.

A second embodiment of the nozzle and nozzle control mechanism is shown in FIGS. 12, 13, 14a, 14b, 15a, and 15b. This embodiment utilizes an annular nozzle 272 including interleaved panels. The annular nozzle operates by contracting uniformly around center flow guide 42 to restrict flow between through the space between annular nozzle 272 and center flow guide 42. Referring first to FIG. 12 and FIGS. 14a and 14b. A plurality of active interleaved nozzle control panels 270 and 271 are connected to each other at their forward and aft ends by bushings 275, which are flanged at each end. One flange of each bushing 275 is secured to the radially inner surface of the radially inner primary panels 270. The shafts of the bushings protrude through slotted holes 276 in the secondary panels 271, with the other flanges of the bushings being on the radially outer side of the secondary panels 271. The flanged bushings 275 hold the primary and secondary panels within a predetermined distance of each other while the primary panels, and therefore the secondary panels, are opened and closed by virtue of the mechanisms which will now be described.

A ramped slotted linkage 215 is attached to each of primary panels 270 along the centerline of the panel outer surface. The forward end of each slotted linkage is pivotally mounted by pinned holes 220 to a panel mounting structure 280 which extends radially inward and aft of annular panel mounting ring 290. FIG. 14a shows a primary panel 270 in maximum open position. A cam follower mounting plate 217 attached to the inner surface of the aft valve tube 57 pivotally mounts a cam follower 216, which in turn is engaged in a slotted hole 230 in the slotted linkage 215.

As the aft valve tube 57 is advanced forward relative to the position of FIG. 14a, the cam follower 216, which is maintained at a fixed radial position for all axial positions, by virtue of the incline of the slotted hole 230 in the slotted linkage 215 causes the slotted linkage 215 and attached primary panel 270 to rotate clockwise about the pinned hole 220 and reacting against the internal aerodynamic forces induced as the air flow is deflected downward.

Figure 15B:
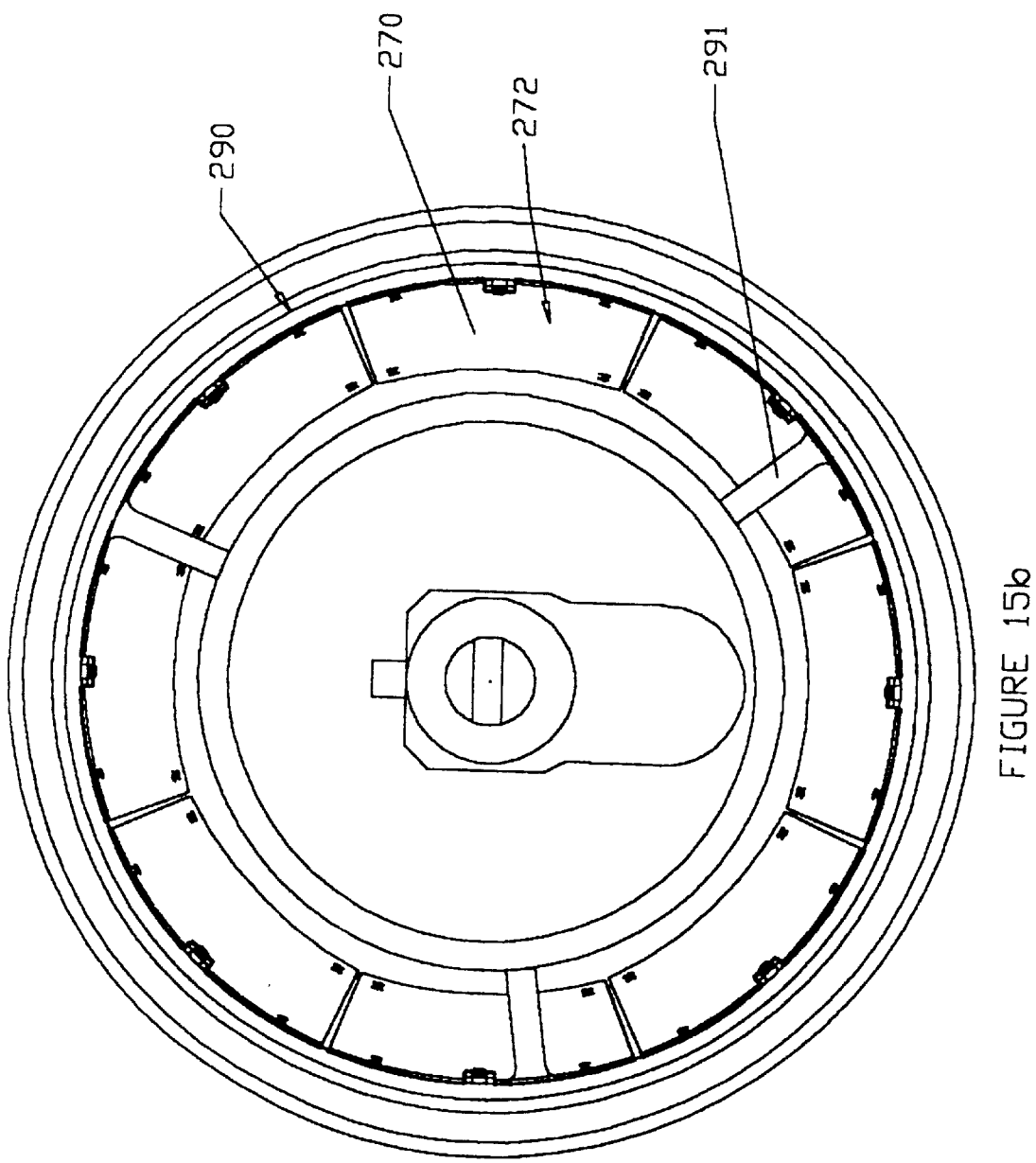
FIG. 15b is a cross-sectional view taken along the line 15—15 in FIG. 12, with the nozzle control doors in their greatest flow restricting position.
Figure 16:
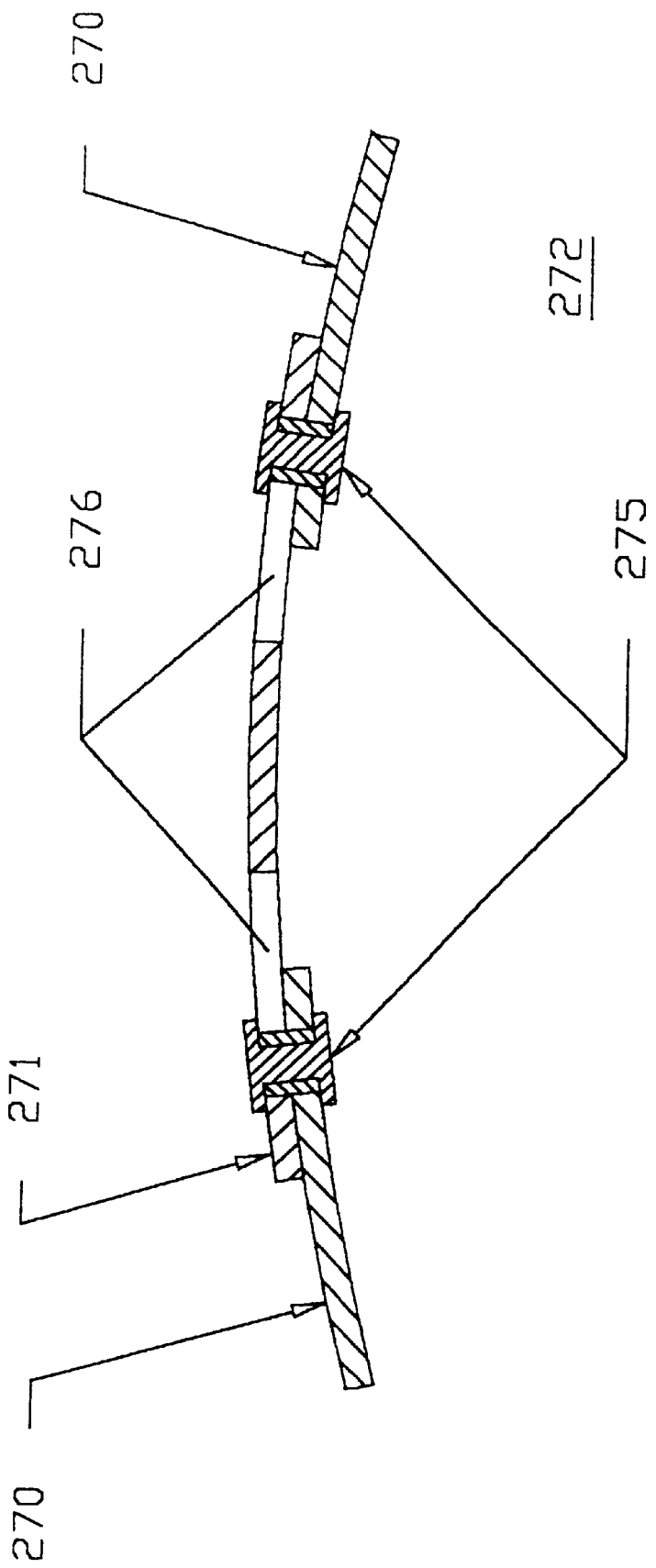
FIG. 16 is an enlarged partial sectional view of the nozzle primary and secondary control doors in their fully open position showing the flanged bushing which secure the primary and secondary control doors to each other.

FIG. 14b shows the relative position of the nozzle control components for the maximum closed position of the nozzle. During the forward motion of the valve tube 57, the valve tube slides over the outer surface of the annular panel mounting ring 290, with a seal means (not shown) located in a groove in the annular mounting ring 290. The annular mounting ring 290 is attached to the center flow guide 42 by means of a plurality of aerodynamic shaped radial spars 291 as shown in FIGS. 15a and 15b. This embodiment of the invention provides for less flow blockage to the stator and turbine than the previously described segmented nozzle embodiment. Movement of the valve tube 57 is controlled by an actuator 101 and an electronic controller as in the previously described embodiment.

The ramped slotted linkage 215 profile, which allows the maximum nozzle opening at position 1, has a geometric contour defined so that for each position forward of position 1 toward position 2, at which point the interleaved panels of annular nozzle 272 are closed to their maximum full power operating extent, the ratio of the exhaust area of the annular nozzle to inlet area of the diffuser is maintained constant.

While preferred embodiments of the invention have been disclosed in detail, it should be understood by those skilled in the art that various modifications can be made to the illustrated embodiment without departing from the scope of the invention as described in the specification and hereafter defined in the appended claims.

What is claimed is:

1. Ram air turbine apparatus comprising:
   a generally cylindrical external fairing having a leading end and an aft end, with an air inlet passage at said leading end, and with a plurality of external exhaust ports proximate said aft end;
   a support structure radially proximate the inner surface of said external fairing, said fairing supported by said support structure, said support structure including a plurality of axial spars,
   a central flow guide coaxially located within and supported by said support structure, said guide having an outer surface spaced from said support structure,
   a valve tube coaxially located intermediate said support structure and said central flow guide in radial proximity to said primary support structure, said valve tube being axially movable with respect to said external fairing and having an aerodynamically contoured nose end,
   a plurality of openings aft said nose end of said valve tube enabling flow of air from said air inlet passage through an annular passage formed between an inner surface of the valve tube and said outer surface of said center flow guide,
   a turbine wheel having vanes,
   a stator means having vanes for directing air flow to said turbine vanes,
   at least one nozzle in said annular passage between the outer surface of said central flow guide and said inner surface of said movable valve tube secured to said center flow guide and extending outward in close proximity to the inner surface of said movable valve tube, said at least one nozzle axially extending from a position proximate to said aft end of said air inlet in said external fairing to a position in close proximity to said stator vanes,
   said valve tube being movable between a first position wherein said contoured nose of said valve tube end is in line with the leading edge of said fairing front end such that a maximum flow area is presented to the air stream in said air inlet allowing maximum air flow through the air inlet, said at least one nozzle, said stator vanes, said turbine vanes, and through said fairing external exhaust ports to a surrounding region, and a second position wherein said valve tube is advanced forward so that the contoured nose end of said valve tube restricts said air inlet area so that reduced airflow occurs through said air inlet, said at least one nozzle, said stator vanes, said turbine vanes, and said fairing external exhaust ports to the surrounding region, and a third position wherein said valve tube is advanced to a maximum forward position so that the contoured nose of the valve tube contacts the inner surface of the fairing air inlet in a manner such that said air inlet is completely closed.

2. The ram air turbine apparatus of claim 1, further comprising a nozzle control intermediate said valve tube and said central flow guide operable to control flow of air through said nozzles in response to movement of said valve tube between said first, second and third positions.

3. The ram air turbine apparatus of claim 2, wherein said nozzle control includes:
   a plurality of circumferentially spaced control doors positioned between and pivotally supported between a pair of parallel nozzle side walls for movement between retracted positions substantially contiguous with the inner surface of said valve tube and extended positions projecting radially inward into said nozzle,
   a cam follower mounted on each of said control doors at a position spaced from said respective pivotal support of said respective door, and
   a slot in each said nozzle side wall forming a cam, whereby movement of said respective cam follower in said respective slot moves said respective control door between a fully retracted position and a fully extended position.

4. The ram air turbine apparatus of claim 3, wherein said nozzle control maintains a fixed ratio of the total exhaust areas of the nozzles to the area of the air inlet passage.

5. The ram air turbine apparatus of claim 2, wherein said nozzle control includes:
   a plurality of alternately interleaved primary and secondary nozzle control panels positioned between and pivotally supported on a panel mounting ring for movement between retracted positions substantially contiguous with the inner surface of said valve tube and extended positions projecting radially inward into said nozzle,
   a cam slot mounted on each of said primary nozzle control panels at a position spaced from said respective pivotal support of said primary nozzle control panels on said panel mounting ring, and
   cam followers mounted on said valve tube, whereby movement of said respective cam followers in said respective cam slots urges said primary nozzle control panels and said interleaved secondary nozzle control panels between a fully retracted position and a fully extended position.

6. The ram air turbine apparatus of claim 5, wherein said nozzle control maintains a fixed ratio of the total exhaust areas of the nozzles to the area of the air inlet passage.

7. Ram air turbine generating apparatus comprising:

a generally cylindrical external fairing having a leading end, said fairing tapered radially inward toward said leading end with a primary air inlet passage at said leading end, and the external fairing extending to an aft end, and having a plurality of external exhaust ports proximate said aft end, a primary structure means radially proximate the inner surface of said external fairing, extending the length of said fairing means, said fairing means mounted to said primary structure, said primary structure including a plurality of straight axial spars extending the length of said external fairing, central flow guide means mounted to said support structure and coaxial therewith, said guide means having an outer surface spaced from said structure means, centerbody/valve tube means intermediate said primary structure means and said central flow guide means coaxial therewith and in radial proximity to said primary structure means, said centerbodylvalve tube means including an aerodynamically contoured nose end with an aft tubular body with the tube connected to the aft larger valve tube portion of the centerbody/valve tube assembly with aerodynamic shaped spars spanning the increased diameter, a plurality of openings therewith set back at a distance from the nose end of said centerbody/valve tube aft end enabling flow of air into and through the openings in said nose end and through an annular passage formed between the inner surface of the valve tube and said center flow guide, a turbine wheel having blades and drivingly coupled to a generator or hydraulic pump or both, stator means for directing air flow to the turbine blades, a plurality of nozzle means, each formed in radial extent in the annular passage between the outer wall of said central flow guide and inner wall of said movable valve tube and in circumferential extent between a set of parallel nozzle side wall means, said nozzle sidewall means consisting of plates mounted to the center flow guide and extending outward within close proximity to the inner wall of said movable valve tube means, and said nozzle side wall means; and said nozzle means extending in axial extent from an axial position proximate to the aft end of said primary air inlet in said external fairing and extending afterward to a position in close proximity to said stator, said valve tube means being movable between a first position whereat said contoured nose of said valve tube end is in line with the leading edge of said fairing front end such that a maximum area flow area is presented to the air stream in said primary air inlet of said external fairing allowing maximum air flow through said primary air inlet, through said plurality of inlet holes in said contoured nose of said valve tube, through said annular nozzle means, through said stator, through said turbine, through an exhaust deflector and said fairing exhaust ports to a surrounding region; and a second position whereat said valve tube is advanced forward so that the contoured nose end of said valve tube restricts the area of said primary air inlet so that reduced airflow occurs through said primary air inlet, through said plurality of inlet holes in the contoured nose of said valve tube, through said annular nozzle means, through said stator, through said turbine, through said exhaust deflector and said fairing exhaust ports to the surrounding region; and a third position whereat said valve tube is advanced forward to a maximum forward position so that the contoured nose of the valve tube contacts the inner surface of the fairing primary air inlet in the manner such that the inlet is completely closed, speed sensor means for detecting the speed of said turbine wheel; and an actuator and speed control means responsive to said speed sensor means for moving said valve tube forward toward the second position when the speed of said turbine wheel exceeds a predetermined value, thereby reducing the primary inlet flow area and air flow through the primary air inlet, nozzle means, and to the turbine; thereby returning the speed of said turbine wheel to the predetermined speed, said actuator and speed control means responsive to said speed sensor means for moving said valve tube afterward toward the first position when the speed of said turbine wheel is less than a predetermined value, thereby increasing the inlet flow area and air flow through the primary air inlet, nozzle means, to the turbine; returning the speed of said turbine wheel to the predetermined speed, said actuator and speed control means responsive to external control for moving said valve tube forward toward the third position when power output is to be stopped thereby completely closing the inlet flow area.

8. The ram air turbine generating apparatus as set forth in claim 7 including:

nozzle control means intermediate said valve tube means and said central flow guide means operable to control flow of air through the nozzle in response to movement of said valve tube means between the first, second, and third positions.

9. The ram air turbine generating apparatus as set forth in claim 8 wherein said nozzle control means includes:

a plurality ofcircumferentially spaced control doors positioned between and pivotally mounted to each of said nozzle side vanes for movement between retracted positions substantially contiguous with the inner surface of said valve tube means and extended positions projecting radially inward into the annular nozzle, a plurality of cam followers, each said cam follower being rotatably mounted to shafts attached to and extending circumferentially outward from each of said control doors adjacent to the end of the respective door and opposite said respective door mounting pivot, a slot in each said side wall of said nozzle side vanes whereby the motion of said respective shaft of said cam followers is accommodated in said nozzle side vanes when said respective nozzle control door moves between a fully retracted position and an extended position, a plurality of twin cams, each said twin cam mounted axially to the inner surface of said valve tube and extending radially inward into the plurality of channels situated between the outboard surfaces of adjoining one of said respective nozzle vanes, and a plurality of torsion springs, each attached on one end to the outboard side of said nozzle vanes in proximity to and engaged on the other end to the cam follower shaft whereby outward forces are applied to said cam followers maintaining contact between each cam follower and cam for all positions of the cam and cam follower; whereby each side of said twin cam simultaneously engages the adjacent cam followers from either side of adjacent said control doors, whereby each of said control doors is held in the retracted position when said valve tube is in the first position, and whereby each of said control doors is held in the extended position when said valve tube means is in the second position.

10. The ram air turbine generating apparatus as set forth in claim 8 including track means for radial positioning and allowing axial sliding motion of said valve tube relative to said primary structure, wherein said track means consists of a plurality of grooves in the radial inboard surface of said longitudinal spars of said primary structure, each said groove accommodating a matching protruding member of said valve tube which slides in said groove with low friction.

11. The ram air turbine generating apparatus as set forth in claim 8 wherein said central flow guide means has an axial bore therein; and wherein said valve tube means aft end is slidably received in the axial bore of said central flow guide means.

12. The ram air turbine generating apparatus as set forth in claim 7 wherein said valve tube means includes an aerodynamic shaped forebody forming said contoured nose end, a plurality of air inlet channels are spaced circumferentially around and set back from the nose end of said contoured nose, a cylindrical body connected to said contoured nose end with aerodynamically shaped spars, and extending afterward to an axial position in close proximity to the front of said stator, and a plurality of said aerodynamically shaped spars connecting the smaller diameter contoured nose to the aft larger diameter valve tube.

13. The ram air turbine generating apparatus as set forth in claim 12 including a turbine with a turbine shaft rotatably mounted at the forward end to the aft side of an aft plate member of said center flow guide and on the aft end to a plate mounted to the primary structure.

14. The ram air turbine generating apparatus as set forth in claim 13 including a forward bearing on said central flow guide means for rotatably mounting said one end of said turbine shaft and an aft bearing on said turbine aft plate of the primary structure bulkhead for rotatably mounting said other end of said turbine shaft.

15. The ram air turbine generating apparatus as set forth in claim 14 including a generator mounted to the aft side of an axially positioned generator mounting plate which is mounted to the primary structure, wherein said generator mounting plate has a bearing for rotatably mounting the shaft of said generator, with a portion of said generator shaft extending forward through said bearing; and a shaft coupler for drivingly coupling said aft shaft of said turbine to said generator shaft.

16. The ram air turbine generating apparatus as set forth in claim 7 wherein said actuator and speed control means includes an electronic speed control circuit and an actuator controlled by said speed control circuit for positioning said valve tube afterward toward the first position when increased speed is needed to match the required turbine speed, and forward toward the third position when decreased turbine speed is needed to match the required turbine speed.

* * * * *